United States Patent
Ishikawa et al.

(10) Patent No.: US 7,819,217 B2
(45) Date of Patent: Oct. 26, 2010

(54) POWER STEERING APPARATUS, METHOD OF CONTROLLING THE SAME AND METHOD OF ASSEMBLING THE SAME

(75) Inventors: Shogo Ishikawa, Saitama (JP); Toshihiro Arai, Saitama (JP); Toru Hasebe, Gunma (JP); Sosuke Sunaga, Saitama (JP); Takashi Sasaki, Saitama (JP)

(73) Assignee: Hitachi, Ltd., Tokyo (JP)

( * ) Notice: Subject to any disclaimer, the term of this patent is extended or adjusted under 35 U.S.C. 154(b) by 546 days.

(21) Appl. No.: 11/812,931

(22) Filed: Jun. 22, 2007

(65) Prior Publication Data

US 2008/0093155 A1 Apr. 24, 2008

(30) Foreign Application Priority Data

Aug. 3, 2006 (JP) ............................. 2006-211729
Jan. 10, 2007 (JP) ............................. 2007-001888

(51) Int. Cl.
*B60K 28/00* (2006.01)

(52) U.S. Cl. .................................................... 180/272

(58) Field of Classification Search ................. 180/272, 180/271; 701/23, 41, 42, 45
See application file for complete search history.

(56) References Cited

U.S. PATENT DOCUMENTS

| 4,796,715 A | 1/1989 | Futaba et al. |
| 5,016,723 A | 5/1991 | Sano |
| 5,190,119 A | 3/1993 | Nomura et al. |
| 5,826,677 A | 10/1998 | Nishizaki et al. |
| 5,925,082 A | 7/1999 | Shimizu et al. |
| 7,199,536 B2 | 4/2007 | Ozaki |

FOREIGN PATENT DOCUMENTS

| CN | 1535227 A | 10/2004 |
| DE | 36 90 102 T1 | 3/1987 |
| DE | 689 13 434 T2 | 8/1994 |
| DE | 691 12 256 T2 | 4/1996 |
| DE | 197 02 383 A1 | 8/1997 |
| JP | 11-339199 A | 12/1999 |

*Primary Examiner*—Faye M. Fleming
(74) *Attorney, Agent, or Firm*—Foley & Lardner LLP

(57) ABSTRACT

A power steering apparatus includes a steering shaft, a hydraulic power cylinder, a hydraulic pump, a steering shaft actuator, a condition sensor, and a fluid pressure controller. The steering shaft is connected to a steering wheel. The hydraulic power cylinder is mechanically linked to the steering shaft. The hydraulic power cylinder has first and second fluid pressure chambers for producing an assist steering effort. The hydraulic pump supplies a first fluid pressure to the hydraulic power cylinder. The steering shaft actuator receives a second fluid pressure from the hydraulic pump, and applies a torque to the steering shaft by the second fluid pressure. The condition sensor collects information concerning at least one of an associated host vehicle, an associated driver and an associated road. The fluid pressure controller receives the collected information from the condition sensor, and controls the steering shaft actuator based on the collected information.

28 Claims, 22 Drawing Sheets

POWER STEERING APPARATUS, METHOD OF CONTROLLING THE SAME AND METHOD OF ASSEMBLING THE SAME

BACKGROUND OF THE INVENTION

The present invention relates generally to hydraulic power steering apparatus, and more particularly to integral power steering apparatus useful in large automotive vehicles.

Japanese Patent Application Publication No. 11-339199 shows a vehicle drive assist system for driving an automotive vehicle while preventing the vehicle from deviating from a desired driving lane when a driver falls asleep or looks aside. The vehicle drive assist system includes a white marking line recognizing camera, and a sight line/blinking recognizing camera. When judging the vehicle as being deviating from the driving lane, or judging the driver as being asleep or looking aside, the vehicle drive assist system automatically steers the vehicle.

SUMMARY OF THE INVENTION

The vehicle drive assist system disclosed in Japanese Patent Application Publication No. 11-339199 is based on an electric power steering system. In general, electric power steering systems have small power capacities. Accordingly, typical large automotive vehicles employ hydraulic power steering systems with large power capacities. It has been difficult to apply such a vehicle drive assist system based on electric power steering system to an automotive vehicle based on hydraulic power steering system, although it may be less difficult to apply such a vehicle drive assist system based on electric power steering system to an automotive vehicle based on electric power steering system.

Accordingly, it is an object of the present invention to provide a hydraulic power steering apparatus capable of automatically controlling steering operation for safety, in various situations such as a situation where a host vehicle is deviating from a desired driving lane, and a situation where a driver's level of consciousness or attention is low.

According to one aspect of the present invention, a power steering apparatus comprises: a steering shaft adapted to be connected to a steering wheel; a hydraulic power cylinder mechanically linked to the steering shaft, the hydraulic power cylinder having first and second fluid pressure chambers for producing an assist steering effort; a hydraulic pump for supplying a first fluid pressure to the hydraulic power cylinder; a steering shaft actuator for receiving a second fluid pressure from the hydraulic pump, and applying a torque to the steering shaft by the second fluid pressure; a condition sensor for collecting information concerning at least one of an associated host vehicle, an associated driver and an associated road; and a fluid pressure controller for receiving the collected information from the condition sensor, and controlling the steering shaft actuator based on the collected information.

According to another aspect of the invention, a power steering apparatus comprises: a housing; an input shaft adapted to be connected to a steering wheel; a piston mounted within the housing, the piston defining first and second fluid pressure chambers on respective sides thereof; a motion conversion mechanism for converting a rotary motion of the input shaft into a longitudinal motion of the piston; a hydraulic pump for supplying a first fluid pressure to the first and second fluid pressure chambers; a rotary valve for directing the first fluid pressure selectively to one of the first and second fluid pressure chambers; a mechanism for outputting a steering effort in accordance with the longitudinal motion of the piston; a steering shaft actuator for receiving a second fluid pressure from the hydraulic pump, and applying a torque to the input shaft by the second fluid pressure; a condition sensor for collecting information concerning at least one of an associated host vehicle, an associated driver and an associated road; and a fluid pressure controller for receiving the collected information from the condition sensor, and controlling the steering shaft actuator based on the collected information.

According to a further aspect of the invention, a method of controlling a power steering apparatus comprising a steering shaft adapted to be connected to a steering wheel; a steering shaft actuator for receiving a fluid pressure from a hydraulic source, and applying a torque to the steering shaft by the fluid pressure; and an electromagnetic valve for controlling the fluid pressure, the method comprises: a first operation of collecting information concerning at least one of an associated host vehicle, an associated driver and an associated road; and a second operation of controlling the fluid pressure by the electromagnetic valve based on the collected information so as to allow the steering shaft actuator to apply the torque to the steering shaft by the controlled fluid pressure.

According to a still further aspect of the invention, a method of assembling a power steering apparatus comprising: a housing; an input shaft adapted to be connected to a steering wheel; a piston mounted within the housing, the piston defining first and second fluid pressure chambers on respective sides thereof; a motion conversion mechanism for converting a rotary motion of the input shaft into a longitudinal motion of the piston; a hydraulic pump for supplying a first fluid pressure to the first and second fluid pressure chambers; a rotary valve for directing the first fluid pressure selectively to one of the first and second fluid pressure chambers; a mechanism for outputting a steering effort in accordance with the longitudinal motion of the piston; a steering shaft actuator for receiving a second fluid pressure from the hydraulic pump, and applying a torque to the input shaft by the second fluid pressure; a condition sensor for collecting information concerning at least one of an associated host vehicle, an associated driver and an associated road; a fluid pressure controller for receiving the collected information from the condition sensor, and controlling the steering shaft actuator based on the collected information; an output shaft mounted within the housing; and a torsion bar coupling the input shaft to the output shaft, wherein the steering shaft actuator comprises: a contact pin extending outwardly from a radial outer periphery of the input shaft; a piston mounted in the output shaft for motion in a radial direction of the output shaft, the piston having a recess at an inner longitudinal end, the recess being adapted to be in contact with the contact pin; and a fluid chamber for receiving the second fluid pressure, and pushing the piston toward the contact pin so as to apply the torque to the input shaft, wherein the input shaft is disposed radially outside of the torsion bar, wherein the output shaft is disposed radially outside of the input shaft, wherein the input shaft includes a plurality of pin support holes each extending in a radial direction of the input shaft, wherein the output shaft includes a plurality of piston slide bores each extending in a radial direction of the output shaft, wherein each of the contact pins is mounted in one of the pin support holes, and wherein each of the contact pins has one longitudinal end outside of the radial outer periphery of the input shaft, and another longitudinal end in contact with a radial outer periphery of the torsion bar, the method comprises: forming the pin support holes and the piston slide bores so that, when the torsion bar is in a neutral state of twist, each of the pin support holes is located with an offset in a circumferential direction of the input shaft with respect to an associated one of the piston slide bores; rotating the input shaft with respect to the output shaft so that each of the pin support holes is located in the same position in the circumferential direction of the input shaft as an associated one of the piston slide bores; and inserting each of the contact pins from radially outside of the output shaft through an associated one of the piston slide bores into an associated one of the pin support holes.

DETAILED DESCRIPTION OF THE INVENTION

Figure 1:
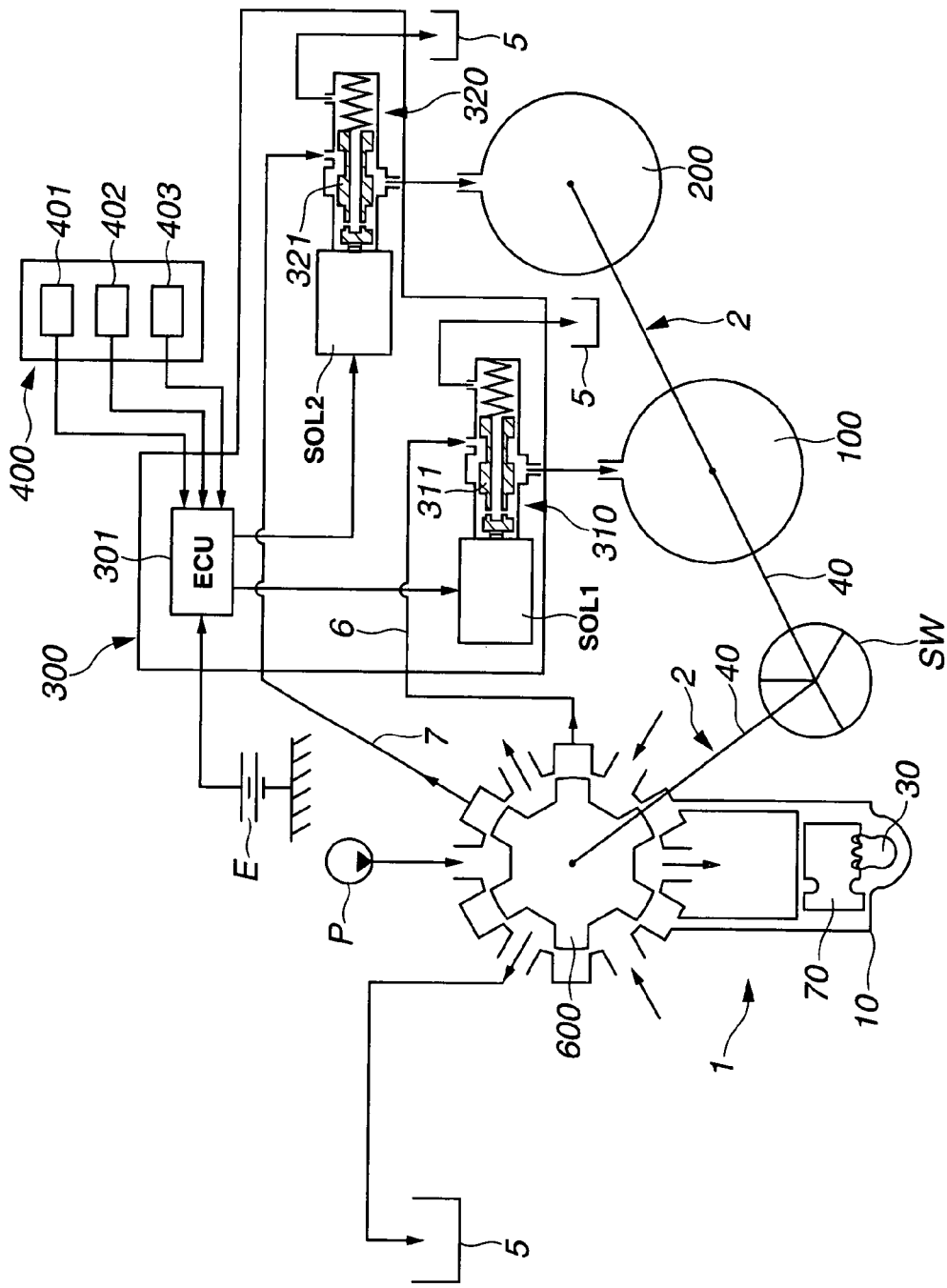
FIG. 1 is a block diagram showing system configuration of a power steering apparatus in accordance with embodiments of the present invention.
Figure 2:
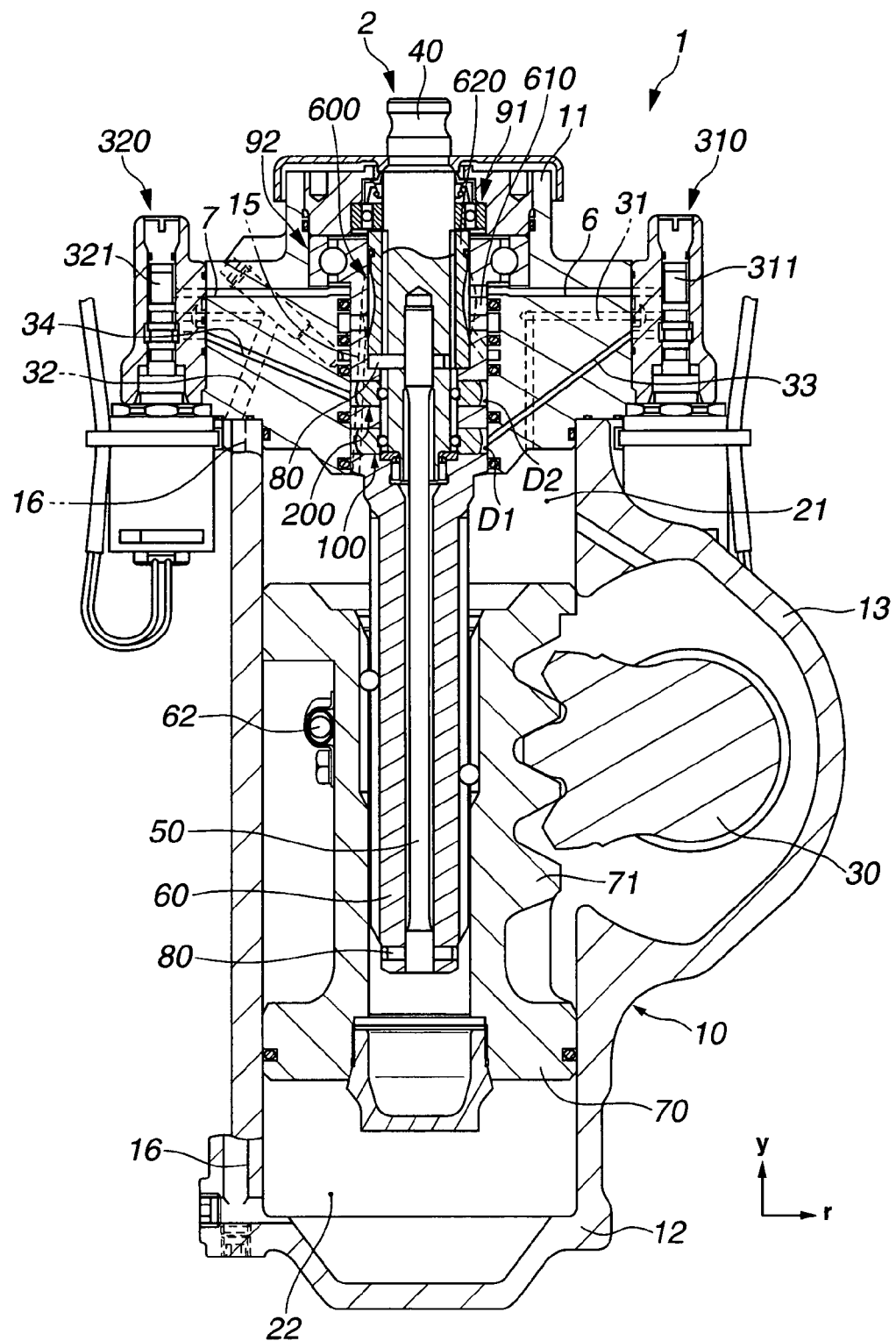
FIG. 2 is a side sectional view of a power steering apparatus in accordance with a first embodiment of the present invention.

The following describes a power steering apparatus in accordance with a first embodiment of the present invention with reference to FIGS. 1 to 9. The power steering apparatus is adapted for a large automotive vehicle such as a truck. In the following, the terms "clockwise" and "counterclockwise" are used for some members in order to describe the directions of turn of those members as viewed from a driver toward a steering wheel. The terms "right" and "left" are also used instead of "clockwise" and "counterclockwise", respectively. As shown in FIG. 2, a coordinate system is assumed for the following description. A y-axis is defined to extend in the axial direction of a steering shaft 2 toward a steering wheel SW. A polar coordinate system is defined as perpendicular to the y-axis. A r-axis is defined to indicate a radial coordinate in the polar coordinate system. The circumferential coordinate extends counterclockwise as viewed from steering wheel SW.

As shown in FIG. 1, a power steering apparatus 1 comprises steering shaft 2, a rotary valve 600, a hydraulic power cylinder 10, and a sector shaft 30. Steering shaft 2 is connected to steering wheel SW for rotation therewith. Rotary valve 600 serves to switch the direction of an assist steering effort. Hydraulic power cylinder 10 is mechanically linked to steering shaft 2. Hydraulic power cylinder 10 accommodates a piston 70. Piston 70 receives a differential fluid pressure, and outputs an assist steering effort. Sector shaft 30 meshes with piston 70 so that a linear motion of piston 70 causes sector shaft 30 to rotate and steer road wheels. The assist steering effort is thus transmitted to the road wheels. Steering shaft 2 generally comprises an input shaft 40, an output shaft 60, and a torsion bar 50 coupling the input shaft 40 to output shaft 60, as shown in FIG. 2.

Power steering apparatus 1 further comprises a first input shaft actuator 100, a second input shaft actuator 200, and a fluid pressure controller 300, as shown in FIG. 1. First and second input shaft actuators 100 and 200 may be collectively referred to as steering shaft actuator. Fluid pressure controller 300 supplies controlled fluid pressures to first and second input shaft actuators 100 and 200 so as to apply a feedback steering torque to input shaft 40.

First and second input shaft actuators 100 and 200 apply to input shaft 40 counterclockwise and clockwise torques, respectively. Under normal operating conditions, first and second input shaft actuators 100 and 200 serve as a steering feedback actuator, producing feedback steering torques. When a driver is asleep or looking aside, or when a driver's level of consciousness or attention is low so that a host vehicle may deviate from a desired driving lane, first and second input shaft actuators 100 and 200 serve as a steering assist actuator, rotating the input shaft 40 so as to actuate rotary valve 600.

When steering wheel SW is turned, a working fluid is supplied from a fluid pump P selectively to one of first and second fluid pressure chambers 21 and 22 of hydraulic power cylinder 10 through the rotary valve 600. The differential pressure between first and second fluid pressure chambers 21 and 22 pushes piston 70 so as to rotate sector shaft 30 to steer the road wheels. An excess part of the working fluid is drained to a fluid reservoir 5, as shown in FIG. 1.

Fluid pressure controller 300 generally comprises an electrical control unit 301, a first control valve 310, and a second control valve 320, as shown in FIG. 1. First and second control valves 310 and 320 are electromagnetic valves. Control unit 301 operates, receiving an electric power from a battery E. Control unit 301 receives a sensing signal from a condition sensor 400, processes the sensing signal, and controls first and second control valves 310 and 320. First and second control valves 310 and 320 are connected to rotary valve 600 through the fluid passages 6 and 7, respectively, so as to receive fluid pressures from pump P.

Condition sensor 400 includes a vehicle speed sensor 401, a driver monitoring camera 402, and a driving lane monitoring camera 403, as shown in FIG. 1. Vehicle speed sensor 401 measures a vehicle speed of the host vehicle. Driver monitoring camera 402 monitors the line of sight of the driver, and the opening of eyes of the driver. Driving lane monitoring camera 403 monitors a positional relationship between the host vehicle and white making lines. Condition sensor 400 outputs signals indicative of such information to control unit 301.

When the driver's level of consciousness or attention is low, control unit 301 controls first and second input shaft actuators 100 and 200 to apply clockwise and counterclockwise feedback steering torques to input shaft 40 so as to vibrate steering wheel SW and thereby to warn the driver.

First and second control valves 310 and 320 receive working fluid through rotary valve 600. When input shaft 40 is turned clockwise with respect to output shaft 60, the working fluid is supplied to first control valve 310. On the other hand, when input shaft 40 is turned counterclockwise with respect to output shaft 60, the working fluid is supplied to second control valve 320. An excess part of the working fluid is drained to fluid reservoir 5.

First control valve 310 comprises a first solenoid SOL1, and a spool 311. Control unit 301 issues a command signal to first solenoid SOL1 to control first solenoid SOL1 so as to actuate spool 311. Thus, first control valve 310 controls a fluid pressure supplied to first input shaft actuator 100. Similarly, second control valve 320 comprises a second solenoid SOL2, and a spool 321. Control unit 301 issues a command signal to second solenoid SOL2 to control second solenoid SOL2 so as to actuate spool 321. Thus, second control valve 320 controls a fluid pressure supplied to second input shaft actuator 200. First and second input shaft actuators 100 and 200 produce feedback steering torques based on the supplied fluid pressures. As shown in FIG. 2, first and second control valves 310 and 320 each has a longitudinal axis extending along a longitudinal axis of the solenoid and along the longitudinal axis of steering shaft 2.

Power steering apparatus 1 includes a housing comprising a first housing 11 and a second housing 12, as shown in FIG. 2. First housing 11 accommodates rotary valve 600. Second housing 12 accommodates piston 70. Second housing 12 is formed with a sector shaft accommodation section 13 in which sector shaft 30 is mounted. First housing 11 in the form of a cup shape is coupled at an open end to an open end of second housing 12 in the form of a cup shape, forming a chamber. Input shaft 40 extends through the bottom of first housing 11. Input shaft 40 is adapted to be connected to steering wheel SW. The rotation of input shaft 40 is converted into a motion of piston 70 in the y-direction.

Piston 70 is mounted in second housing 12 for motion in the longitudinal direction, as shown in FIG. 2. The axial direction of sector shaft 30 is perpendicular to the longitudinal direction of piston 70. Piston 70 includes an external tooth portion 71 at a radial outer periphery. External tooth portion 71 is meshed with teeth formed in a radial outer periphery of sector shaft 30. Thus, the linear motion of piston 70 is converted into the rotary motion of sector shaft 30. Sector shaft 30 and external tooth portion 71 serve as a mechanism for outputting a steering effort in accordance with the longitudinal motion of piston 70. Piston 70 liquid-tightly separates the inner space of second housing 12 into first fluid pressure chamber 21 on the positive y-side and second fluid pressure chamber 22 on the negative y-side.

Second housing 12 extends in normal to the axial direction of sector shaft 30, as shown in FIG. 2. Sector shaft accommodation section 13 is formed at a radial outer periphery of second housing 12. Sector shaft accommodation section 13 is connected to first fluid pressure chamber 21 so that working fluid is introduced into sector shaft accommodation section 13. The introduced working fluid is used to lubricate the meshing site between sector shaft 30 and external tooth portion 71 of piston 70.

Output shaft 60 is mechanically linked to hydraulic power cylinder 10 as follows. Output shaft 60 is inserted in a center longitudinal bore of piston 70. Output shaft 60 is engaged with piston 70 through a ball screw mechanism 62 as a motion conversion mechanism. The rotary motion of output shaft 60 is thus converted into the longitudinal motion of piston 70.

Output shaft 60 has the form of a tubular shape. As viewed in FIG. 2, input shaft 40 is mounted in an upper portion of the axial bore of output shaft 60, while torsion bar 50 is mounted in a lower portion of the axial bore of output shaft 60. Thus, input shaft 40 is disposed radially outside of torsion bar 50, while output shaft 60 is disposed radially outside of input shaft 40 Input shaft 40 is coupled to output shaft 60 by connecting the input shaft 40 to the upper end of torsion bar 50 and connecting the output shaft 60 at the lower end to the lower end of torsion bar 50 as viewed in FIG. 2. Torsion bar 50 elastically absorbs a torque applied from first and second input shaft actuators 100 and 200 to input shaft 40, thereby minimizing undesirable effects to the steered road wheels. A first bearing 91 is provided in first housing 11 to support input shaft 40 for rotation. A second bearing 92 is provided in first housing 11 to support output shaft 60 for rotation.

Figure 3:
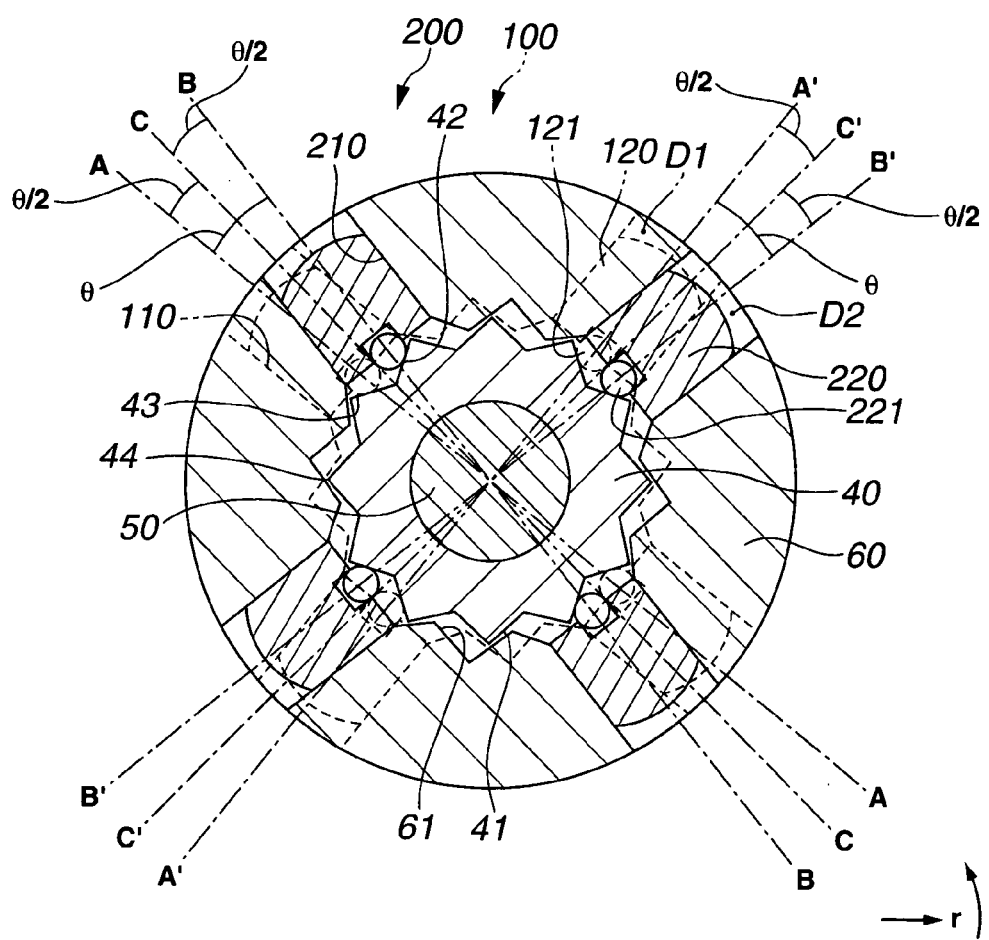
FIG. 3 is a cross sectional view of a second input shaft actuator of the power steering apparatus of FIG. 2.

Input shaft 40 is formed with a serrated section 41 on the negative y-side of rotary valve 600, as shown in FIGS. 2 and 3. Input shaft serrated section 41 overlaps with output shaft 60 in the y-direction. On the other hand, output shaft 60 is formed with a serrated section 61 as shown in FIG. 3 on the negative y-side of rotary valve 600. Output shaft serrated section 61 overlaps with input shaft serrated section 41 in the y-direction. First and second input shaft actuators 100 and 200 include these input shaft serrated section 41 and output shaft serrated section 61. Input shaft serrated section 41 is loosely meshed with output shaft serrated section 61 for relative movement. A serration crest 44 of input shaft serrated section 41 is restricted within the trough of output shaft serrated section 61 so as to prevent torsion bar 50 from twisting excessively.

First fluid pressure chamber 21 defined in second housing 12 is connected to rotary valve 600 through a fluid passage 15 defined in first housing 11, as shown in FIG. 2. Second fluid pressure chamber 22 is connected to rotary valve 600 through a fluid passage 16 defined in second housing 12 and first housing 11.

Rotary valve 600 regulates and distributes, or supplies and drains working fluid to and from first and second fluid pressure chambers 21 and 22 through an inlet port and an outlet port in accordance with the rotational position of input shaft 40 with respect to output shaft 60. Rotary valve 600 includes a valve body 610, and a rotor 620, as shown in FIG. 2. Valve body 610 is fixed to or formed in an upper end portion of output shaft 60 as viewed in FIG. 2. Rotor 620 in the form of a hollow cylindrical shape is disposed radially inside of valve body 610, and fixed to an outer periphery of input shaft 40 through an engagement pin 80. Rotary valve 600 is connected to first fluid pressure chamber 21 through fluid passage 31. When rotor 620 rotates clockwise with respect to valve body 610 as viewed in the negative y-direction, the pump discharge pressure is introduced into first fluid pressure chamber 21, and the working fluid is drained from second fluid pressure chamber 22 through fluid passage 32. On the other hand, when rotor 620 rotates counterclockwise with respect to valve body 610, the pump discharge pressure is introduced into second fluid pressure chamber 22, and the working fluid is drained from first fluid pressure chamber 21 through fluid passage 31. In other words, when input shaft 40 rotates clockwise with respect to output shaft 60 as viewed in the negative y-direction, first fluid pressure chamber 21 is connected to pump P. On the other hand, when input shaft 40 rotates counterclockwise with respect to output shaft 60, second fluid pressure chamber 22 is connected to pump P.

First and second input shaft actuators 100 and 200 are arranged in the y-direction on the negative y-side of rotary valve 600, as shown in FIG. 2. First input shaft actuator 100 includes four piston slide bores 110, and four pistons 120 arranged evenly in the circumferential direction of output shaft 60, as shown by dotted lines in FIG. 3. Each piston slide bore 110 is formed to extend in the r-direction through the wall of output shaft 60. Each piston 120 is mounted in piston slide bore 110 for sliding motion. Similarly, second input shaft actuator 200 includes four piston slide bores 210, and four pistons 220 arranged evenly in the circumferential direction of output shaft 60, as shown in FIG. 3. Each piston slide bore 210 is formed to extend in the redirection through the wall of output shaft 60. Each piston 220 is mounted in piston slide bore 210 for sliding motion. Piston 120 defines a first fluid chamber D1 outside thereof in the radial direction of output shaft 60, while piston 220 defines a second fluid chamber D2 outside thereof in the radial direction of output shaft 60, as shown in FIG. 3. First fluid chamber D1 is connected to first fluid pressure chamber 21 through fluid passages 31 and 33, and first control valve 310, as shown in FIG. 2. Second fluid chamber D2 is connected to second fluid pressure chamber 22 through fluid passages 32 and 34, and second control valve 320, as shown in FIG. 2. First and second control valves 310 and 320 receive fluid pressures from first and second fluid pressure chambers 21 and 22, and control the fluid pressures, and supply the controlled fluid pressure to first and second input shaft actuators 100 and 200.

Each piston 120 is in contact with input shaft 40 through a contact member 121, as shown in FIG. 3. Contact member 121 is spherically formed, and retained by a recess formed in the inner longitudinal end surface of piston 120. When the fluid pressure in first fluid chamber D1 changes, piston 120 moves in piston slide bore 110 in the r-direction. The inward motion of piston 120 results in pushing the contact member 121 to input shaft serrated section 41. Similarly, each piston 220 is in contact with input shaft 40 through a contact member 221. Contact member 221 is spherically formed, and retained by a recess formed in the inner longitudinal end surface of piston 220. When the fluid pressure in second fluid chamber D2 changes, piston 220 moves in piston slide bore 210 in the redirection. The inward motion of piston 220 results in pushing the contact member 221 to input shaft serrated section 41.

First input shaft actuator 100 is displaced with respect to second input shaft actuator 200 in the circumferential direction of input shaft 40 or output shaft 60 as follows. As shown in FIG. 3, piston slide bore 110 for first input shaft actuator 100 has a center axis A-A or A'-A', while piston slide bore 210 for second input shaft actuator 200 has a center axis B-B or B'-B'. The center axis A-A or A'-A' has an offset angle θ with respect to the center axis B-B or B'-B'. Under neutral conditions, input shaft serrated section 41 is positioned so that a line connecting two opposite troughs of input shaft serrated section 41, is identical to a line C-C or C'-C'. As viewed in FIG. 3, the center axis A-A or A'-A' of piston slide bore 110 is displaced counterclockwise with respect to the line C-C or C'-C' by θ/2, while the center axis B-B or B'-B' of piston slide bore 210 is displaced clockwise with respect to the line C-C or C'-C' by θ/2. Therefore, contact member 221 is in contact with a second angled contact surface 42 of input shaft serrated section 41 which extends clockwise from the trough, pushing the input shaft 40 at that contact point. On the other hand, contact member 121 is in contact with a first angled contact surface 43 of input shaft serrated section 41 which extends counterclockwise from the trough, pushing the input shaft 40 at that contact point.

When second angled contact surface 42 is pushed inwardly in the r-direction, input shaft 40 is rotated clockwise as viewed in FIG. 3. On the other hand, when first angled contact surface 43 is pushed inwardly in the r-direction, input shaft 40 is rotated counterclockwise. Thus, piston 120 with contact member 121 serves to rotate input shaft 40 counterclockwise, while piston 220 with contact member 221 serves to rotate input shaft 40 clockwise.

The spherical shape of contact member 121 or 221 is effective for smooth and stable contact between piston 120 or 220 and the serrated section 41 of input shaft 40. This allows to convert smoothly the longitudinal motion of piston 120 or 220 into a rotary motion of input shaft 40.

Figure 4:
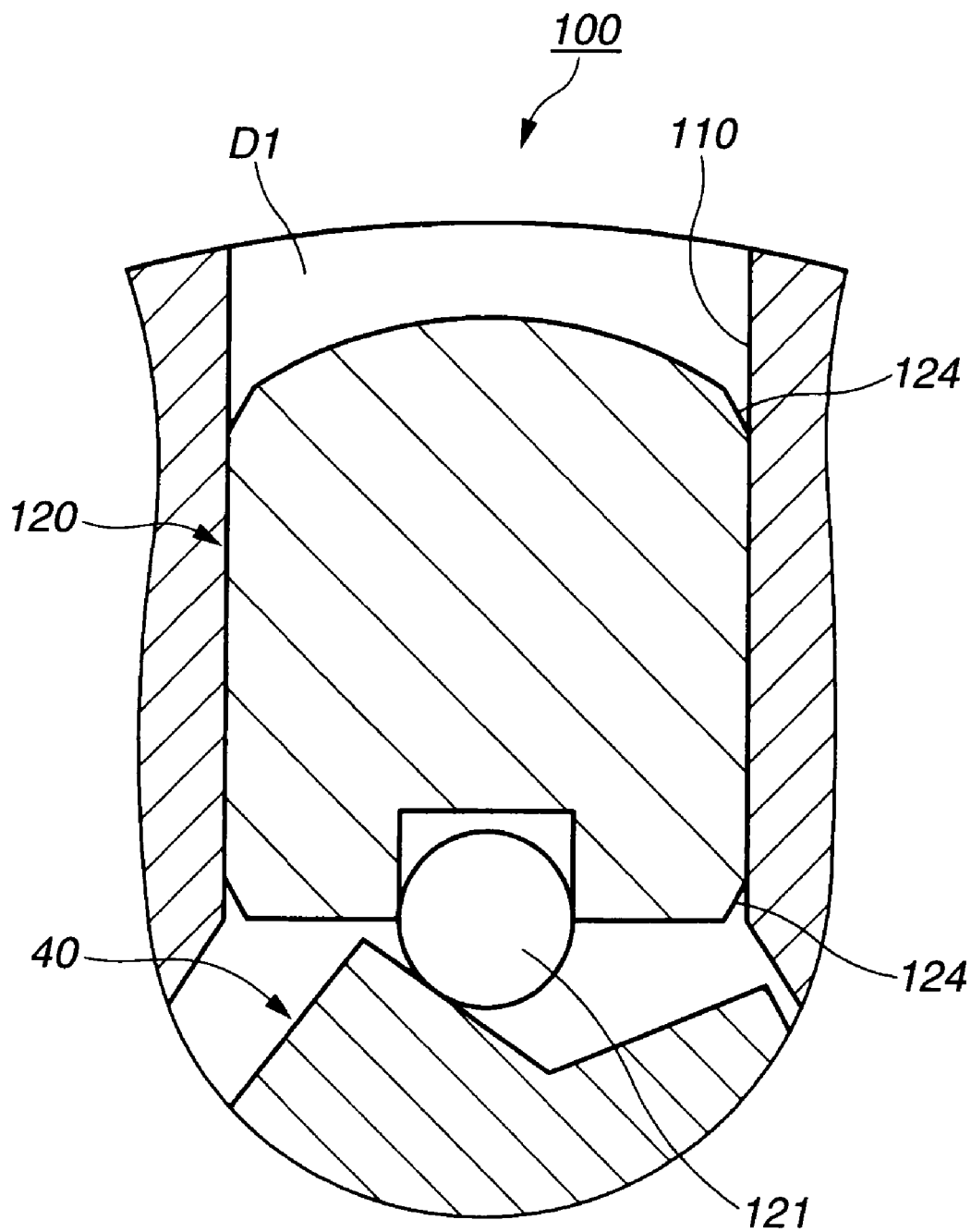
FIG. 4 is an enlarged partial cross sectional view of a first input shaft actuator of the power steering apparatus of FIG. 2.

As shown in FIG. 4, piston 120 includes chamfers 124 and 124 at the periphery of the longitudinal ends. Each chamfer 124 is defined by a circular conical surface tapered toward the extremity. Piston 220 includes similar chamfers. These chamfers are effective for smooth sliding motion of the associated piston. Chamfer 124 may be differently formed, for example, in the form of a circular spherical surface.

Figure 5:
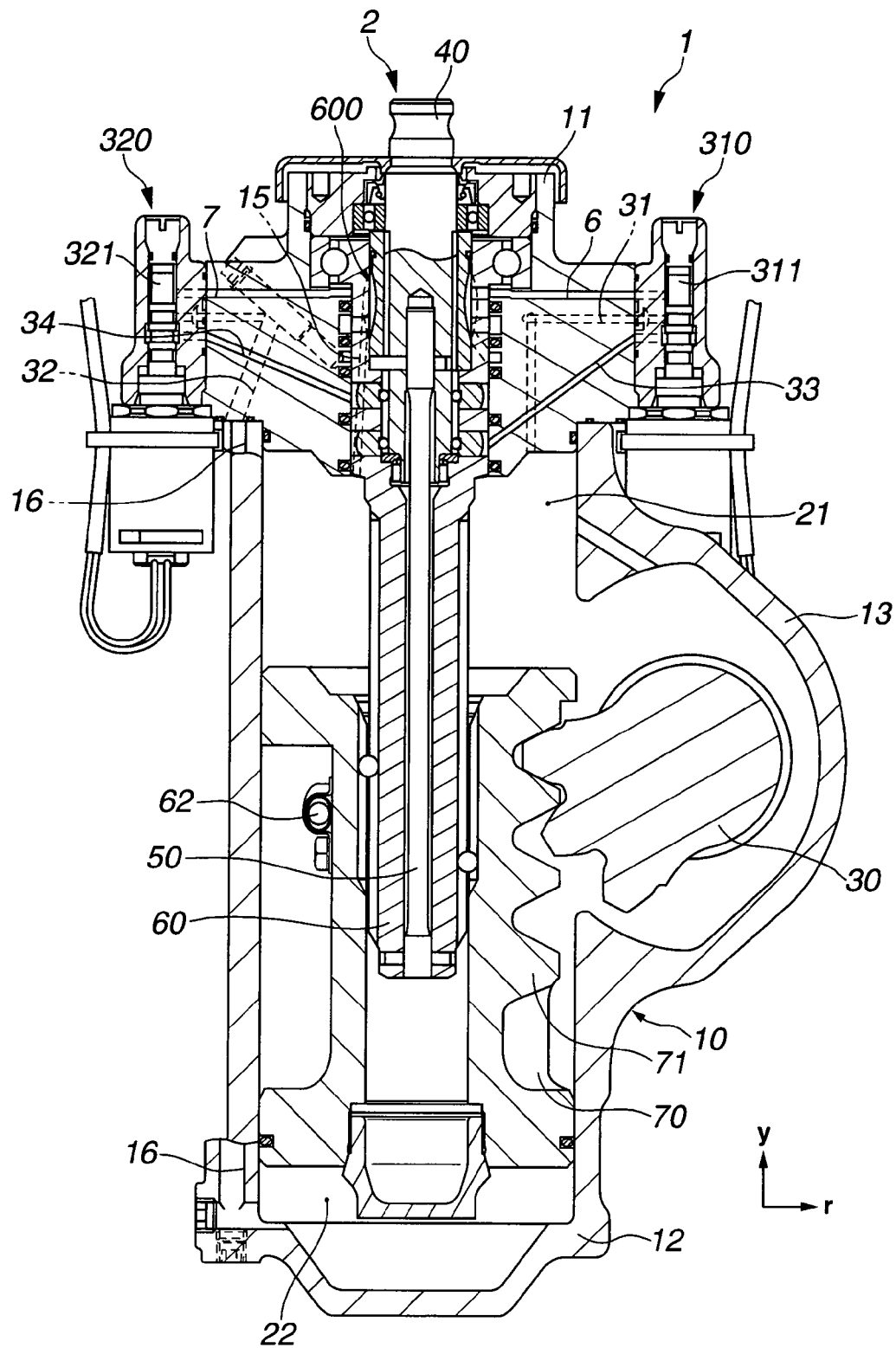
FIG. 5 is a side sectional view of the power steering apparatus of FIG. 2 under condition that a steering wheel is turned clockwise.

FIG. 5 shows a situation where steering wheel SW is turned clockwise. When steering wheel SW is turned clockwise, rotary valve 600 introduces the pump discharge pressure into first fluid pressure chamber 21, causing a differential pressure between first and second fluid pressure chambers 21 and 22. This causes piston 70 to travel in the negative y-direction, and thereby causes sector shaft 30 to rotate counterclockwise as viewed in FIG. 5 to assist the clockwise steering operation. Under that situation, a working fluid is introduced from first fluid pressure chamber 21 into first control valve 310 through fluid passage 31. First control valve 310 controls the hydraulic pressure, and supplies the same to first fluid chamber D1 through the fluid passage 33. This causes piston 120 to travel so that first input shaft actuator 100 pushes input shaft 40 counterclockwise, producing a feedback steering torque to steering wheel SW. Similarly, when steering wheel SW is turned counterclockwise, a working fluid is introduced from second fluid pressure chamber 22 into second control valve 320 through fluid passages 16 and 32. Second control valve 320 controls the hydraulic pressure, and supplies the same to second fluid chamber D2 through the fluid passage 34. This causes piston 220 to travel so that second input shaft actuator 200 pushes input shaft 40 clockwise, producing a feedback steering torque to steering wheel SW.

Figure 6:
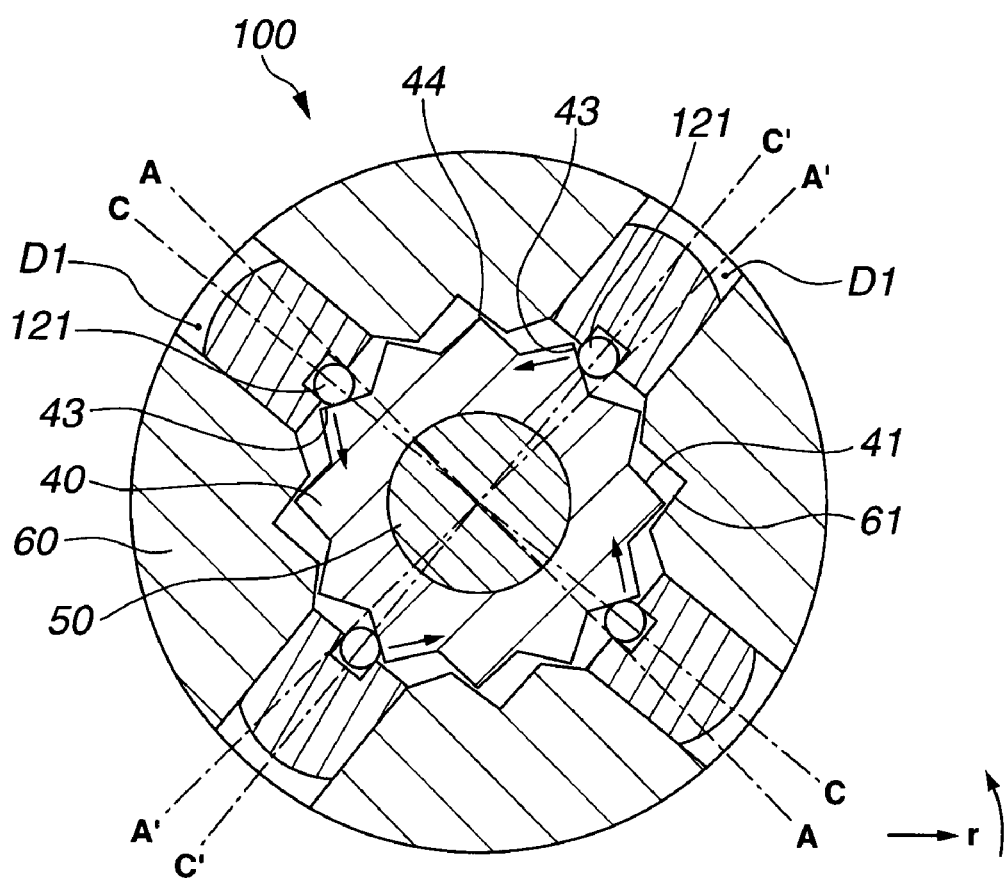
FIG. 6 is a cross sectional view of the first input shaft actuator of the power steering apparatus of FIG. 2.
Figure 7:
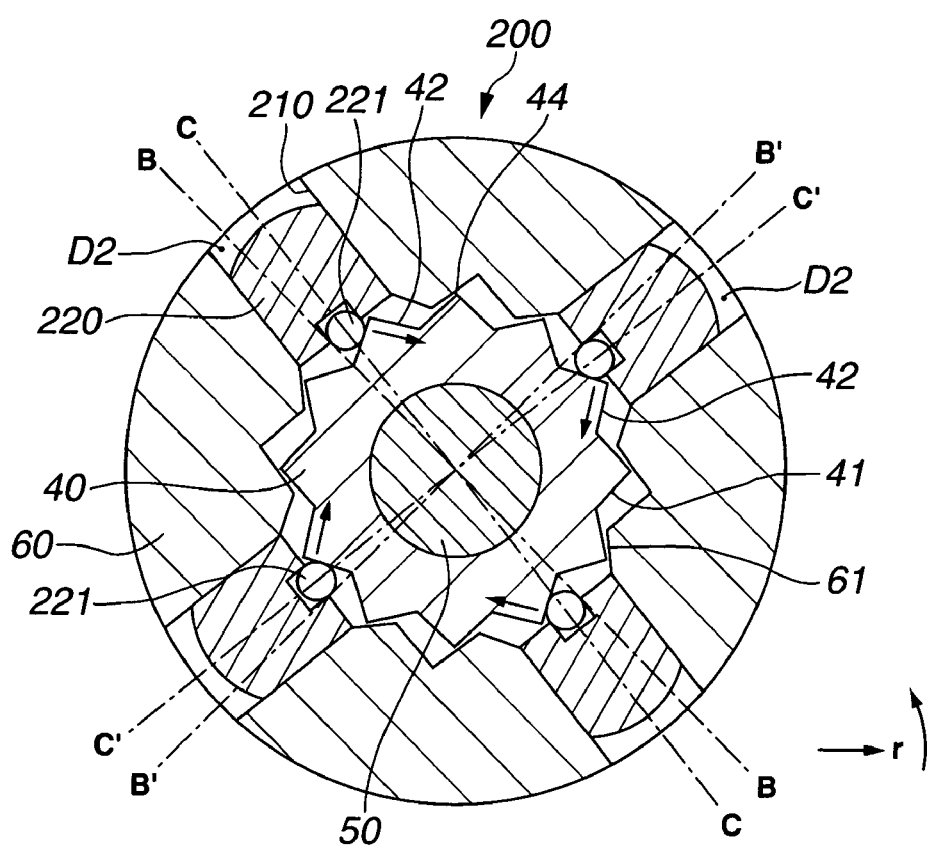
FIG. 7 is a cross sectional view of the second input shaft actuator of the power steering apparatus of FIG. 2.

Specifically, under normal operating conditions, first and second input shaft actuators 100 and 200 operate as follows. When the fluid pressure in first fluid pressure chamber 21 is high, first input shaft actuator 100 applies a counterclockwise torque to input shaft 40 as shown in FIG. 6. On the other hand, when the fluid pressure in second fluid pressure chamber 22 is high, second input shaft actuator 200 applies a clockwise torque to input shaft 40 as shown in FIG. 7. Under such situations, control unit 301 controls first and second control valves 310 and 320 on the basis of the vehicle speed measured by vehicle speed sensor 401 so as to apply a suitable torque in accordance with vehicle operating conditions.

The power steering apparatus is configured to check by driver monitoring camera 402 whether or not the driver's level of consciousness or attention is low. When a fall in the driver's level of consciousness or attention is detected, control unit 301 controls first and second control valves 310 and 320 alternately to fluctuate the fluid pressure in first and second fluid chambers D1 and D2 of first and second input shaft actuators 100 and 200 alternately. This causes pistons 120 and 220 to push the input shaft 40 alternately in the clockwise and counterclockwise directions. As a result, steering wheel SW, which is coupled fixedly to input shaft 40, vibrates in the clockwise and counterclockwise directions, thereby warning the driver.

The power steering apparatus is configured to check by driving lane monitoring camera 403 whether or not the host vehicle is deviating from the current driving lane. When such deviation is detected, control unit 301 controls first and second control valves 310 and 320 to rotate input shaft 40 so that input shaft 40 is displaced with respect to output shaft 60 within the allowable range defined by input shaft serrated section 41 and output shaft serrated section 61. This changes the operating state of rotary valve 600 to steer actively the host vehicle back into a desired position. For example, when the host vehicle is deviating leftward from the current driving lane, control unit 301 controls second control valve 320 to rotate input shaft 40 clockwise so that rotor 620 rotates clockwise with respect to valve body 610 in rotary valve 600. This increases the fluid pressure in first fluid pressure chamber 21 so as to produce an assist steering torque in the clockwise direction, and to direct the host vehicle rightward toward the center of the current driving lane. On the other hand, when the host vehicle is deviating rightward from the current driving lane, control unit 301 controls first control valve 310 to rotate input shaft 40 counterclockwise so that rotor 620 rotates counterclockwise with respect to valve body 610 in rotary valve 600. This increases the fluid pressure in second fluid pressure chamber 22 so as to produce an assist steering torque in the counterclockwise direction, and to direct the host vehicle leftward toward the center of the current driving lane. Thus, the power steering apparatus prevents the host vehicle from deviating from the current driving lane.

Figure 8:
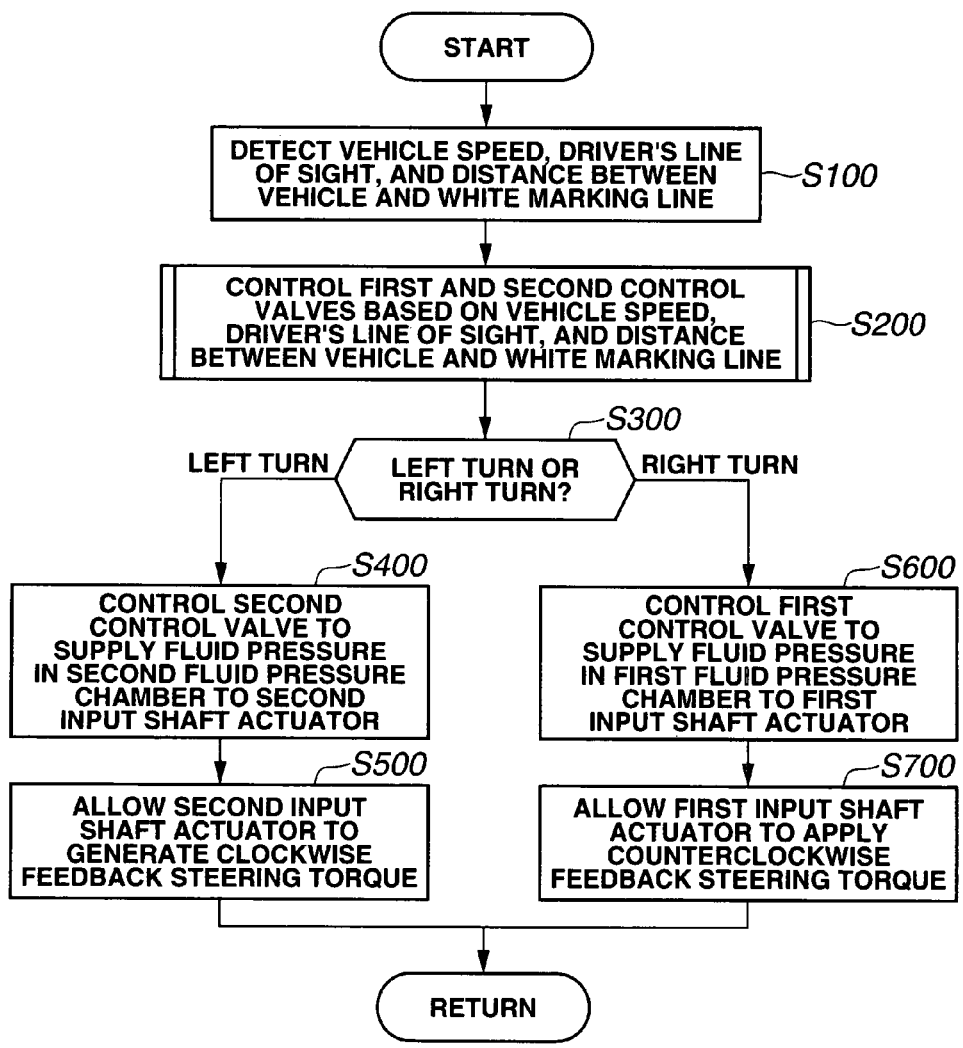
FIG. 8 is a flow chart showing a process of controlling a feedback steering torque under normal operating conditions in accordance with the first embodiment.

Under normal operating conditions, control unit 301 carries out a process of controlling feedback steering torque as shown in FIG. 8. At Step S100, control unit 301 detects vehicle operating conditions such as a vehicle speed, a driver's line of sight, and a distance between the host vehicle and white marking lines. Subsequently, at Step S200, control unit 301 controls first and second control valves 310 and 320 so as to apply a suitable torque to input shaft 40, depending on the detected vehicle operating conditions. Subsequently, at Step S300, control unit 301 determines whether steering wheel SW is turned left or right. When steering wheel SW is turned left, the process proceeds to Step S400. On the other hand, when steering wheel SW is turned right, the process proceeds to Step S600. At Step S400, control unit 301 controls second control valve 320 to supply the fluid pressure in second fluid pressure chamber 22 to second input shaft actuator 200. Subsequent to Step S400, at Step S500, control unit 301 applies a clockwise feedback steering torque to input shaft 40 while input shaft 40 is turned counterclockwise. At step S600, control unit 301 controls first control valve 310 to supply the fluid pressure in first fluid pressure chamber 21 to first input shaft actuator 100. Subsequent to Step S600, at Step S700, control unit 301 applies a counterclockwise feedback steering torque to input shaft 40 while input shaft 40 is turned clockwise. The process returns after Step S500 or S700. At Step S200, control unit 301 may control the feedback steering torque in accordance with the road resistance which varies with vehicle speed. Specifically, control unit 301 may control the feedback steering torque to increase with increasing vehicle speed in order to attain a suitable balance between the vehicle stability at high speed and the assist steering torque at low speed.

Figure 9:
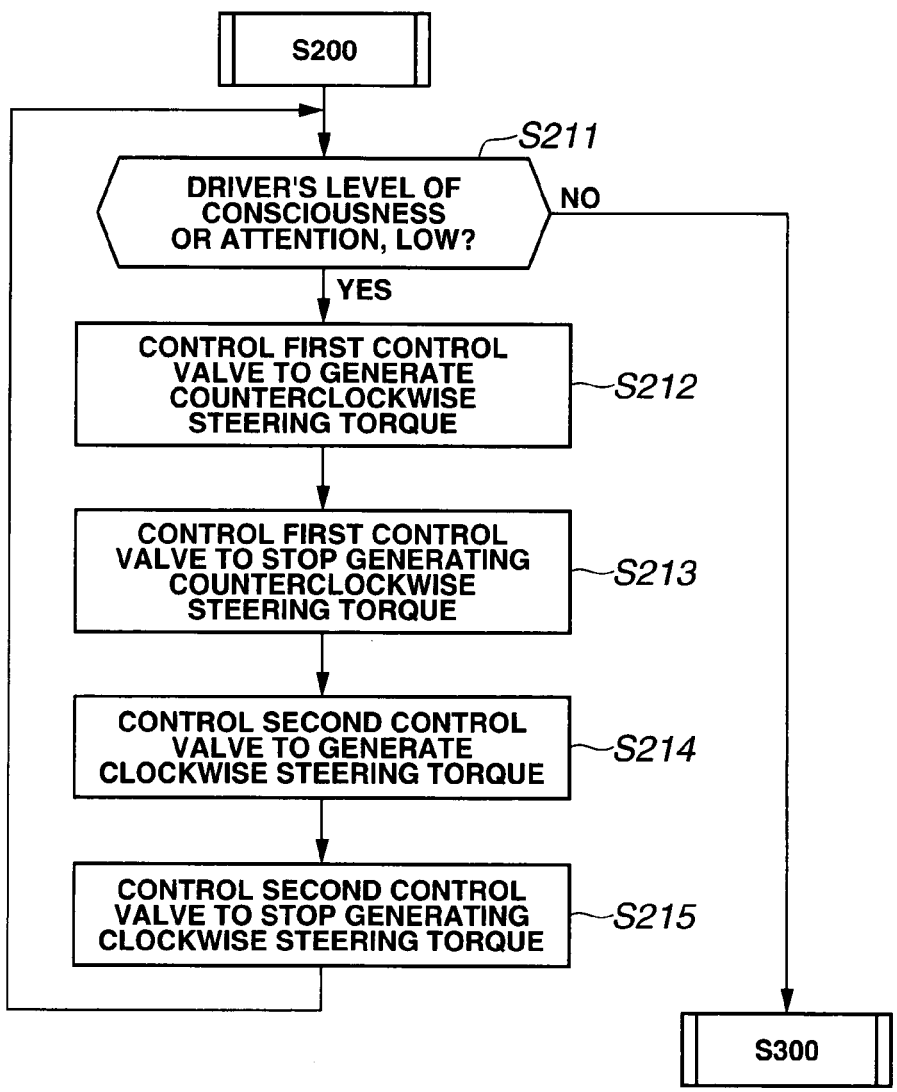
FIG. 9 is a flow chart showing a process of warning a driver when a driver's level of consciousness or attention is low.

At Step 200, control unit 301 also carries out a process of warning a driver, as shown in the flow chart of FIG. 9. At step S211, control unit 301 determines, on the basis of the signal from driver monitoring camera 402, whether or not the driver's level of consciousness or attention is low, specifically whether or not the driver's level of consciousness or attention is below a threshold. When the answer to Step S211 is YES, the process proceeds to step S212. On the other hand, when the answer to step S211 is NO, the process returns to Step S300. At step S212, control unit 301 controls first control valve 310 to apply a counterclockwise torque to input shaft 40. Subsequently, at Step 213, control unit 301 stops the controlling the first control valve 310. Subsequently, at Step S214, control unit 301 controls second control valve 320 to apply a clockwise torque to input shaft 40. Subsequently, at Step 215, control unit 301 stops the controlling the second control valve 320. Subsequently, the process returns back to Step S211. Thus, the process from Step S211 to Step S215 is repeated until the driver's level of consciousness or attention is recovered. Thus, when determining that the at least one of the driver's level of consciousness and the driver's level of attention is below the threshold, fluid pressure controller 300 supplies a fluid pressure alternately to first fluid chamber D1 and to second fluid chamber D2.

Figure 10:
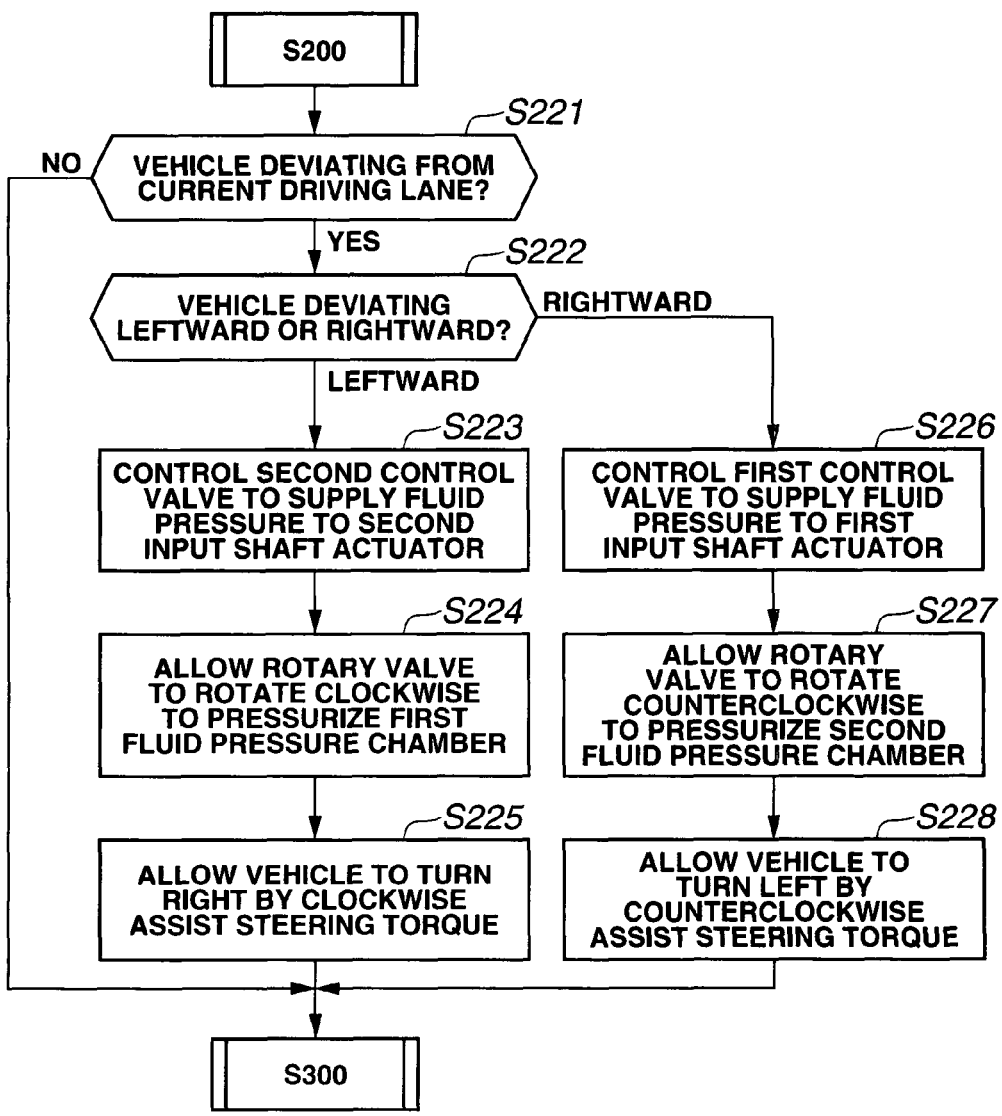
FIG. 10 is a flow chart showing a process of preventing a host vehicle from deviating from a desired driving lane.

At Step 200, control unit 301 also carries out a process of preventing a host vehicle from deviating from a desired driving lane, as shown in the flow chart of FIG. 10. At Step S221, control unit 301 determines, on the basis of the signal from driving lane monitoring camera 403, whether or not the host vehicle is deviating from the current driving lane. When the answer to Step S221 is YES, the process proceeds to step S222. On the other hand, when the answer to step S221 is NO, the process returns to Step S300. At step S222, control unit 301 determines whether the host vehicle is deviating leftward or rightward. When the host vehicle is deviating leftward, the process proceeds to Step S223. When the host vehicle is deviating rightward, the process proceeds to Step S226. At Step S223, control unit 301 controls second control valve 320 to apply a clockwise torque to input shaft 40. Subsequently, at Step S224, control unit 301 allows rotary valve 600 to rotate clockwise so as to raise the fluid pressure P1 in first fluid pressure chamber 21. Subsequently, at Step S225, control unit 301 produces a clockwise assist steering effort so as to rotate the host vehicle clockwise. Subsequently, the process returns to Step S300. On the other hand, at Step S226, control unit 301 controls first control valve 310 to apply a counterclockwise torque to input shaft 40. Subsequently, at Step S227, control unit 301 allows rotary valve 600 to rotate counterclockwise so as to raise the fluid pressure P2 in second fluid pressure chamber 22. Subsequently, at Step S228, control unit 301 produces a counterclockwise assist steering effort so as to rotate the host vehicle counterclockwise. Subsequently, the process returns to Step S300. Thus, fluid pressure controller 300 selects one from first and second fluid chambers D1 and D2 based on the position of the host vehicle with respect to the driving lane, and supplies a fluid pressure to the selected one of first and second fluid chambers D1 and D2.

The power steering apparatus according to the first embodiment provides at least the following advantageous effects. The power steering apparatus requires no additional drive unit such as electric motor in order to apply a feedback steering torque to input shaft 40. The control for driving lane deviation prevention is implemented with no additional actuator for steering wheel SW or the steered wheels. The provision of chamfers 124, 224 of piston 120, 220 is effective for smoothly inserting the piston 120, 220 into piston slide bore 110, 210, and allowing smooth sliding motion of piston 120, 220. The arrangement that first solenoid SOL1 and first control valve 310 are disposed coaxially with one another, in parallel to the longitudinal axis of input shaft 40, is effective for minimizing the radial size of the power steering apparatus.

The following describes a power steering apparatus in accordance with a second embodiment of the present invention with reference to FIGS. 11 to 17. The second embodiment differs from the first embodiment in the hydraulic system including first and second fluid pressure chambers 21 and 22, and rotary valve 600, and the detailed construction of first and second input shaft actuators 100 and 200. The second embodiment is described with the same notations with regard to similar elements as in the first embodiment.

Figure 11:
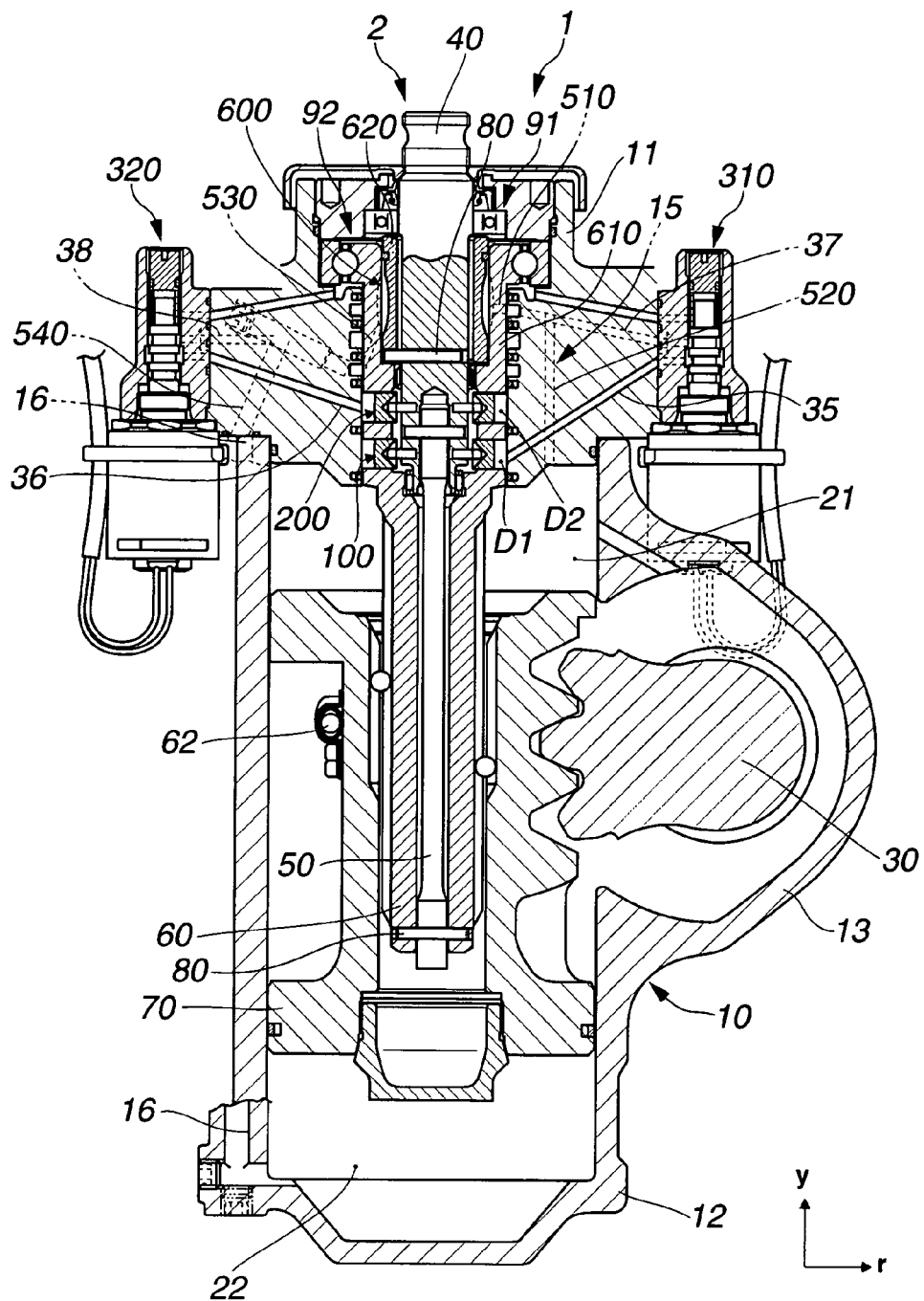
FIG. 11 is a side sectional view of a power steering apparatus in accordance with a second embodiment of the present invention.
Figure 12:
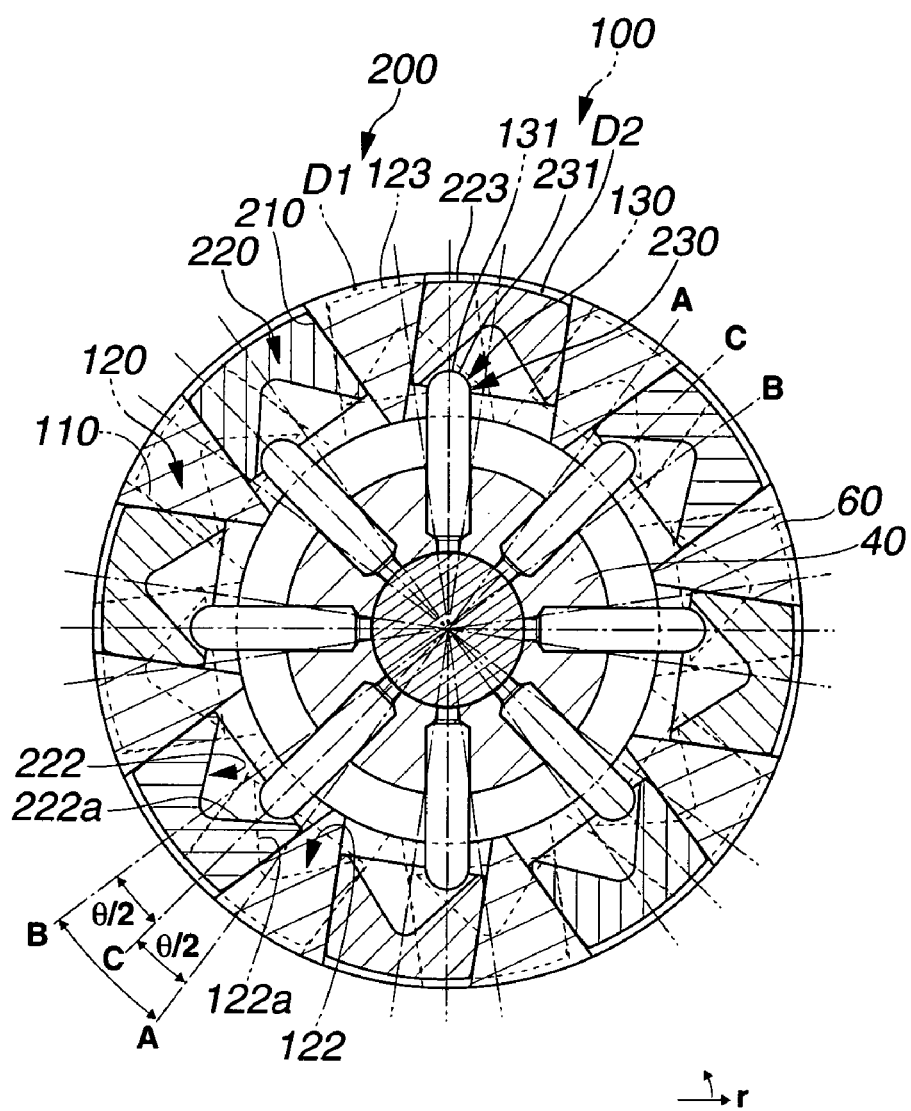
FIG. 12 is a cross sectional view of a second input shaft actuator of the power steering apparatus of FIG. 11.

According to the second embodiment, input shaft 40 has an outer cylindrical surface instead of input shaft serrated section 41, as shown in FIGS. 11 and 12. Moreover, output shaft 60 has an inner cylindrical surface instead of output shaft serrated section 61. First and second input shaft actuators 100 and 200 are constructed similarly as follows. Input shaft actuator 100, 200 includes a piston 120, 220, and a contact pin 130, 230 as shown in FIG. 12. Contact pin 130, 230 has the form of a rod. Input shaft 40 includes eight pin support holes 140, 240 arranged evenly in the circumferential direction. Each pin support hole 140, 240 extends in the redirection. Contact pin 130, 230 is press-fitted or fixed in pin support hole 140, 240, having an outer longitudinal end portion 131, 231 extending outwardly from the outer periphery of input shaft 40 in the redirection. Output shaft 60 includes eight piston slide bores 110, 210 arranged evenly in the circumferential direction. Piston 120, 220 is mounted in piston slide bore 110, 210 for sliding motion. The inner longitudinal end face of each piston 120, 220 is formed with a recess 122, 222. Recess 122, 222 has the form of a conical circular surface, having a surface angled with respect to the direction of motion of piston 120, 220. The outer longitudinal end portion 131, 231 of each contact pin 130, 230 has the form of a curved shape such as a semispherical shape.

In assembling the power steering apparatus, contact pin 130, 230 is mounted in such a manner that outer longitudinal end portion 131, 231 is located in piston slide bore 110, 210. Specifically, contact pin 130, 230 is mounted in such a manner that outer longitudinal end portion 131, 231 is in contact with recess 122, 222. This is effective for restricting the input shaft 40 within a range of angle defined by the circumferential length of piston slide bore 110, 210, or recess 122, 222, and thereby for preventing the torsion bar 50 from twisting excessively.

Piston 120 defines first fluid chamber D1 outside thereof in the radial direction of output shaft 60, while piston 220 defines second fluid chamber D2 outside thereof in the radial direction of output shaft 60, as shown in FIG. 12. Piston 120 receives the fluid pressure in first fluid chamber D1 at the outer end surface 123, while piston 220 receives the fluid pressure in second fluid chamber D2 at the outer end surface 223. Receiving the fluid pressure from fluid chamber D1, D2, the piston 120, 220 travels in piston slide bore 110, 210 inwardly in the radial direction of output shaft 60. Upon this, the outer longitudinal end portion 131, 231 of contact pin 130, 230 is brought into contact with recess 122, 222 of piston 120, 220. Thus, piston 120, 220 pushes contact pin 130, 230.

First fluid chamber D1 is connected to first control valve 310 through a fluid passage 510 and a fluid passage 35, while second fluid chamber D2 is connected to second control valve 320 through a fluid passage 530 and a fluid passage 38, as shown in FIG. 11. Fluid passage 510 and fluid passage 530 are defined in output shaft 60, and connected to rotary valve 600. The y-position of fluid passages 510 and 530 are different or distant from that of first and second input shaft actuators 100 and 200. This ensures sufficient spaces where first and second input shaft actuators 100 and 200 are arranged. First fluid chamber D1 is connected to first fluid pressure chamber 21 through fluid passages 35 and 37, and first control valve 310. Second fluid chamber D2 is connected to second fluid pressure chamber 22 through fluid passages 36 and 38, and second control valve 320. Fluid passage 510 is connected to first fluid pressure chamber 21 through a fluid passage 520 defined in first housing 11. Fluid passage 530 is connected to second fluid pressure chamber 22 through a fluid passage 540 defined in first housing 11. The fluid pressure in first and second fluid pressure chambers 21 and 22 are controlled by first and second control valves 310 and 320, and supplied to first and second input shaft actuators 100 and 200.

First input shaft actuator 100 is displaced with respect to second input shaft actuator 200 in the circumferential direction of input shaft 40 or output shaft 60 as described in the first embodiment, as shown in FIG. 12. The contact point between piston 120 and contact pin 130 is located at a portion 122*a* of recess 122 which extends from the trough of recess 122 in the counterclockwise direction, so that piston 120 pushes input shaft 40 in the counterclockwise direction. On the other hand, the contact point between piston 220 and contact pin 230 is located at a portion 222*a* of recess 222 which extends from the trough of recess 222 in the clockwise direction, so that piston 220 pushes input shaft 40 in the clockwise direction. Thus, the fluid pressure in first and second fluid chambers D1 and D2 are effectively converted into a torque to rotate the input shaft 40.

Figure 13:
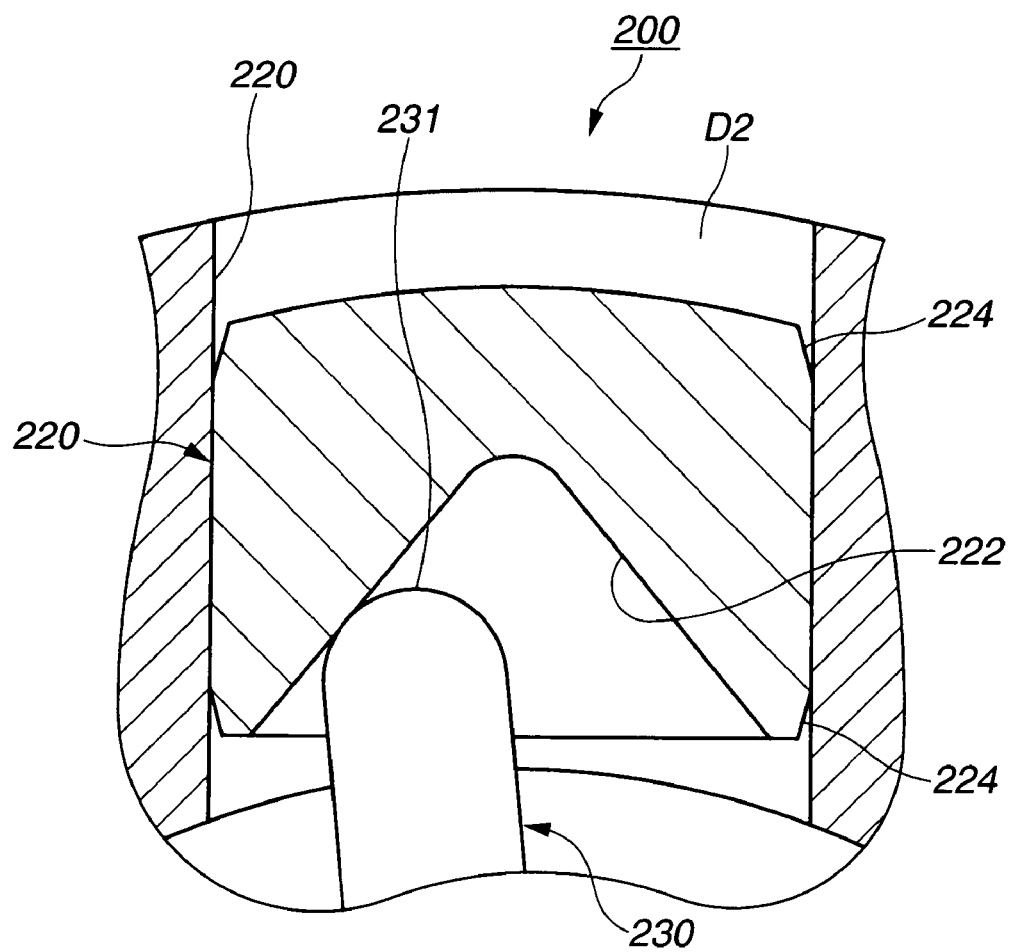
FIG. 13 is an enlarged partial cross sectional view of the second input shaft actuator of the power steering apparatus of FIG. 11.

As shown in FIG. 13, piston 220 includes chamfers 224 and 224 at the periphery of the longitudinal ends. Each chamfer 224 is defined by a circular conical surface tapered toward the extremity. Piston 120 includes similar chamfers. These chamfers are effective for smooth sliding motion of the associated piston. Chamfer 224 may be differently formed, for example, in the form of a circular spherical surface.

Figure 14:
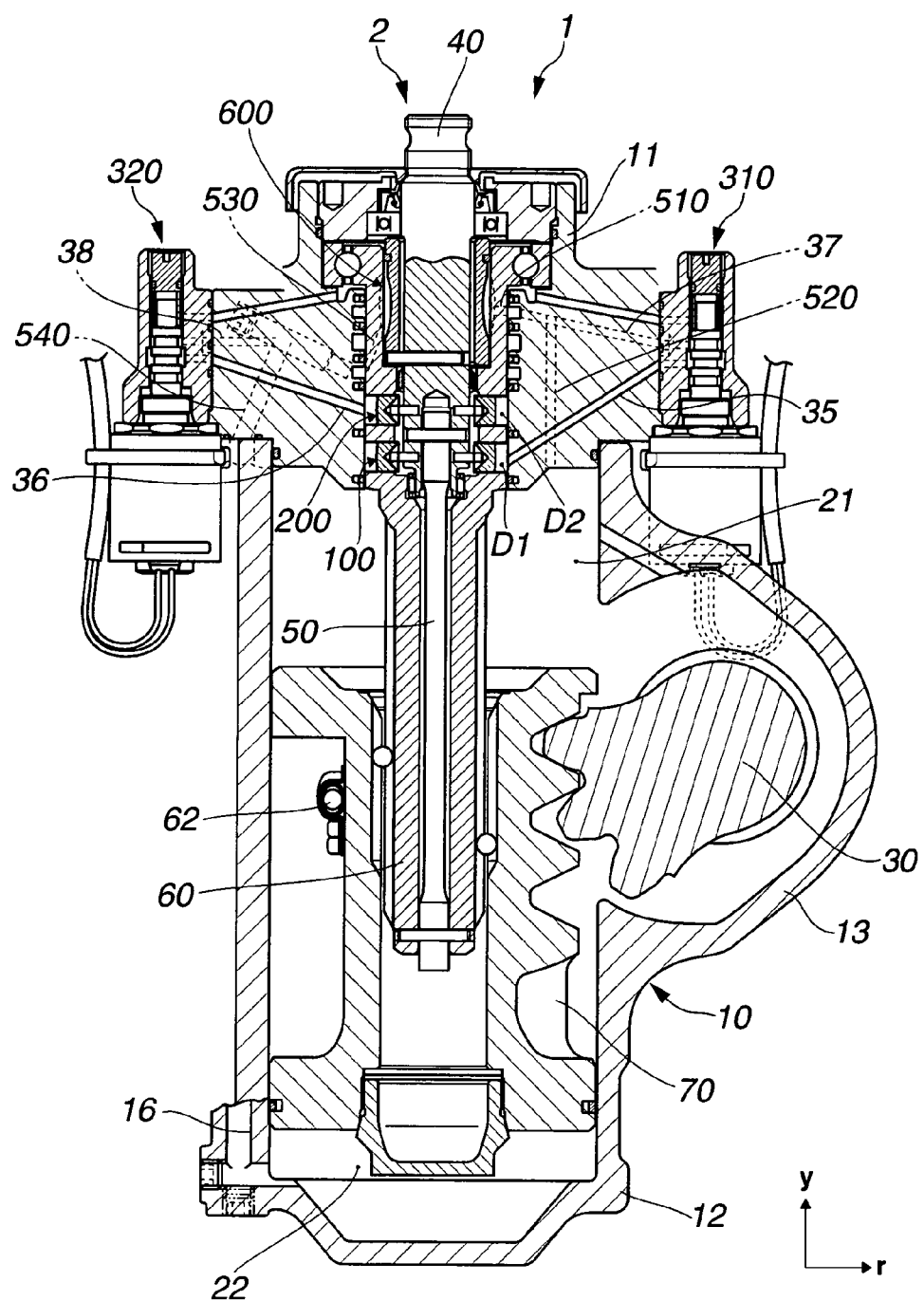
FIG. 14 is a side sectional view of the power steering apparatus of FIG. 11 under condition that a steering wheel is turned clockwise.

FIG. 14 shows a situation where steering wheel SW is turned clockwise. When steering wheel SW is turned clockwise, rotary valve 600 introduces the pump discharge pressure into first fluid pressure chamber 21, causing a differential pressure between first and second fluid pressure chambers 21 and 22. This causes piston 70 to travel in the negative y-direction, and thereby causes sector shaft 30 to rotate counterclockwise as viewed in FIG. 14 to assist the clockwise steering operation. Under that situation, a working fluid is introduced from first fluid pressure chamber 21 into first control valve 310 through fluid passages 520 and 37. First control valve 310 controls the hydraulic pressure, and supplies the same to first fluid chamber D1 through the fluid passage 35. This causes piston 120 to travel so that first input shaft actuator 100 pushes input shaft 40 counterclockwise, producing a feedback steering torque to steering wheel SW. Similarly, when steering wheel SW is turned counterclockwise, a working fluid is introduced from second fluid pressure chamber 22 into second control valve 320 through fluid passages 16, 540 and 38. Second control valve 320 controls the hydraulic pressure, and supplies the same to second fluid chamber D2 through the fluid passage 36. This causes piston 220 to travel so that second input shaft actuator 200 pushes input shaft 40 clockwise, producing a feedback steering torque to steering wheel SW.

The steering torque produced by first and second input shaft actuators 100 and 200 may be adjusted by changing the angle of inclination of the surfaces of recesses 122 and 222 with respect to the direction of motion of piston 120 and 220, respectively.

The curved surface of the outer longitudinal end portion 131, 231 of contact pin 130, 230 is effective for smooth conversion from the sliding motion of piston 120, 220 to the rotary motion of input shaft 40.

Figure 15:
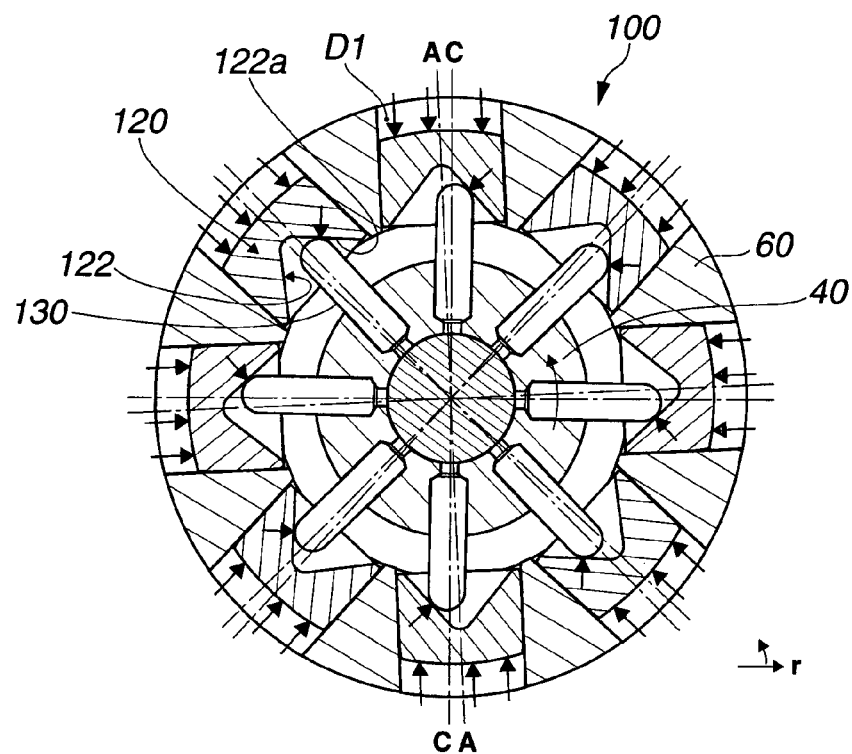
FIG. 15 is a cross sectional view of a first input shaft actuator of the power steering apparatus of FIG. 11.
Figure 16:
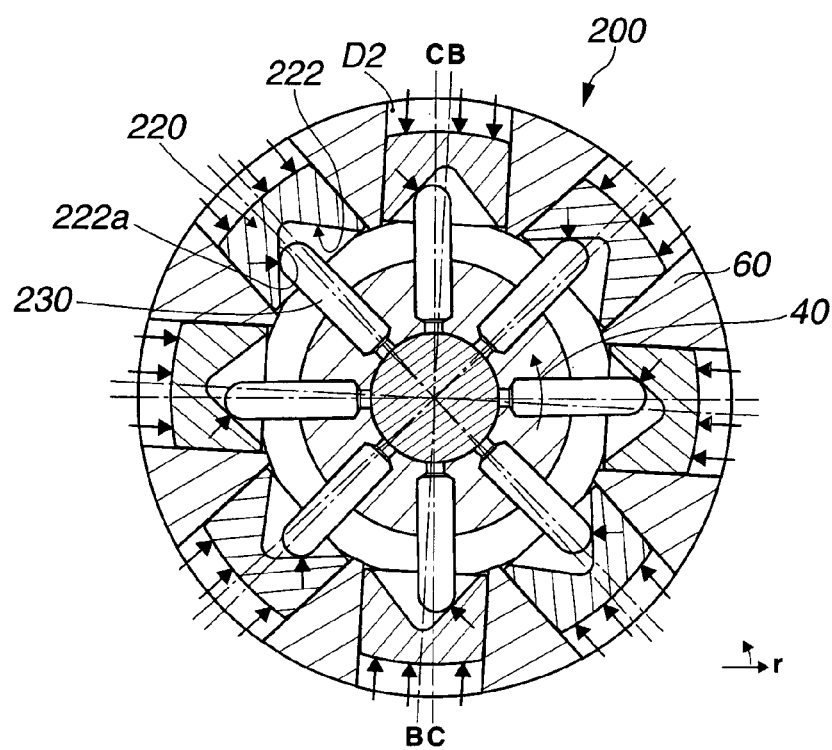
FIG. 16 is a cross sectional view of the second input shaft actuator of the power steering apparatus of FIG. 11.
Figure 17:
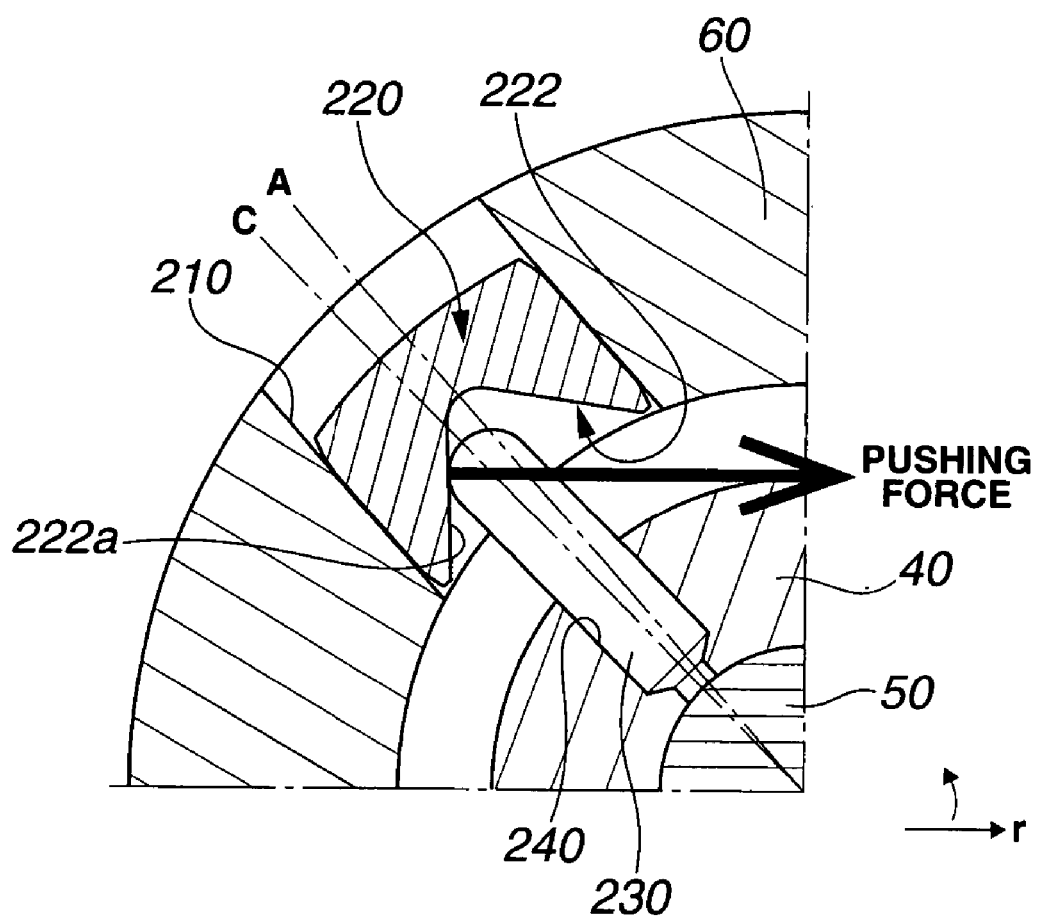
FIG. 17 is an enlarged partial cross sectional view of the second input shaft actuator of the power steering apparatus of FIG. 11.

Under normal operating conditions, first and second input shaft actuators 100 and 200 operate as follows. When the fluid pressure in first fluid pressure chamber 21 is high, first input shaft actuator 100 produces a counterclockwise torque to input shaft 40 as shown in FIG. 15. On the other hand, when the fluid pressure in second fluid pressure chamber 22 is high, second input shaft actuator 200 produces a clockwise torque to input shaft 40 as shown in FIG. 16. FIG. 17 shows an enlarged partial cross sectional view of second input shaft actuator 200, focusing on piston 120.

The power steering apparatus according to the second embodiment operates similarly as in the first embodiment as follows. The power steering apparatus is configured to check by driving lane monitoring camera 403 whether or not the host vehicle is deviating from the current driving lane. When such deviation is detected, control unit 301 controls first and second control valves 310 and 320 to rotate input shaft 40 so that input shaft 40 is displaced with respect to output shaft 60 within the allowable range defined by recesses 122 and 222 of pistons 120 and 220. This changes the operating state of rotary valve 600 to steer actively the host vehicle back into a desired position. For example, when the host vehicle is deviating leftward from the current driving lane, control unit 301 controls second control valve 320 to rotate input shaft 40 clockwise so that rotor 620 rotates clockwise with respect to valve body 610 in rotary valve 600. This increases the fluid pressure in first fluid pressure chamber 21 so as to produce an assist steering torque in the clockwise direction, and to direct the host vehicle rightward toward the center of the current driving lane. On the other hand, when the host vehicle is deviating rightward from the current driving lane, control unit 301 controls first control valve 310 to rotate input shaft 40 counterclockwise so that rotor 620 rotates counterclockwise with respect to valve body 610 in rotary valve 600. This increases the fluid pressure in second fluid pressure chamber 22 so as to produce an assist steering torque in the counterclockwise direction, and to direct the host vehicle leftward toward the center of the current driving lane. Thus, the power steering apparatus prevents the host vehicle from deviating from the current driving lane.

The following describes a power steering apparatus in accordance with a third embodiment of the present invention with reference to FIGS. 18 to 23. The third embodiment differs from the second embodiment in the structure of retaining the contact pins 130 and 230 of first and second input shaft actuators 100 and 200. The third embodiment is described with the same notations with regard to similar elements as in the second embodiment.

Figure 18:
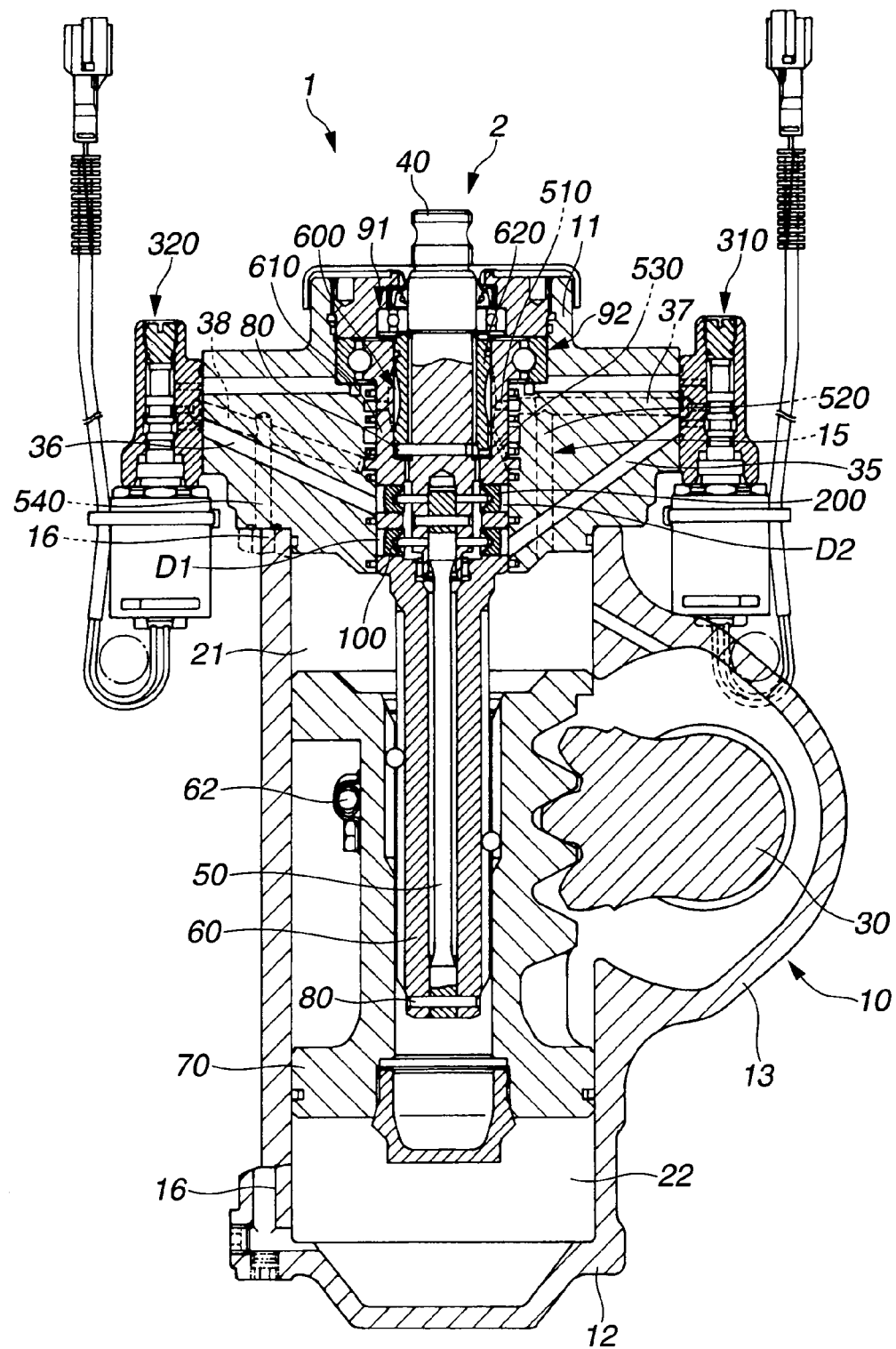
FIG. 18 is a side sectional view of a power steering apparatus in accordance with a third embodiment of the present invention.
Figure 19:
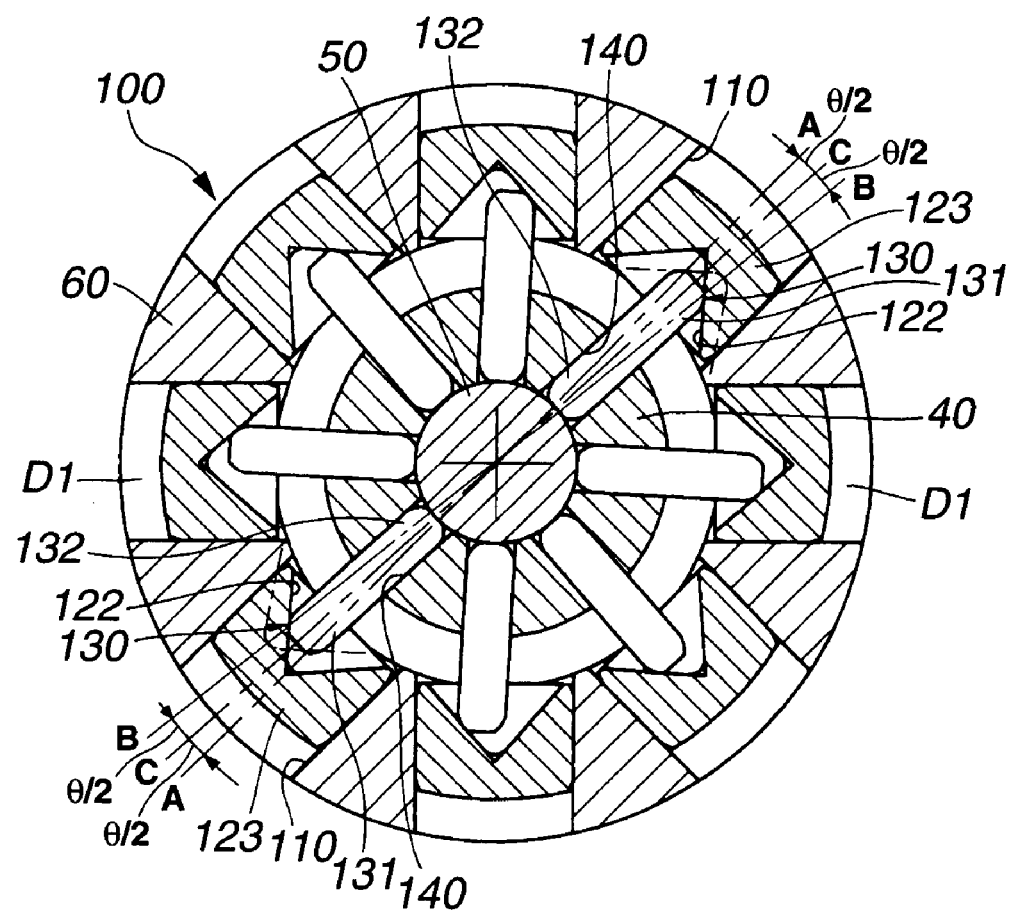
FIG. 19 is a cross sectional view of a first input shaft actuator of the power steering apparatus of FIG. 18.

First input shaft actuator 100 and second input shaft actuator 200 are constructed similarly as in the second embodiment as follows, as shown in FIGS. 18 and 19. Input shaft actuator 100, 200 includes a piston 120, 220, and a contact pin 130, 230. Contact pin 130, 230 has the form of a rod. Input shaft 40 includes eight pin support holes 140, 240 arranged evenly in the circumferential direction. Each pin support hole 140, 240 extends in the redirection. Contact pin 130, 230 is press-fitted or fixed in pin support hole 140, 240, having an outer longitudinal end portion 131, 231 extending outwardly from the outer periphery of input shaft 40 in the redirection. The outer longitudinal end portion 131, 231 has an angled surface adapted to be in surface-to-surface contact with the angled contact surface of recess 122, 222. Contact pin 130, 230 has an inner longitudinal end portion 132, 232 in contact with a radial outer periphery of torsion bar 50. Each contact pin 130, 230 is disposed in an opposite position to another contact pin 130, 230 with respect to the radial center of input shaft 40.

Figure 20:
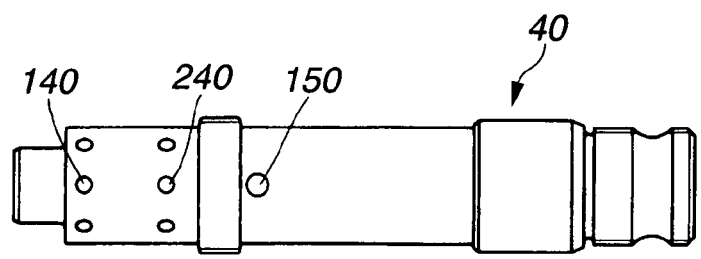
FIG. 20 is a plan view of an input shaft of a steering shaft of the power steering apparatus of FIG. 18.

FIG. 20 shows a plan view of input shaft 40 as separated. Input shaft 40 includes a radial through hole 150 which is adapted for engagement pin 80. Incidentally, engagement pin 80 fixes rotor 620 to input shaft 40 as shown in FIG. 18. One pin support hole 140 or 240 is disposed in the same circumferential position of input shaft 40 as radial through hole 150, extending in the same radial direction of input shaft 40 as radial through hole 150. The other pin support holes 140 or 240 are arranged evenly with respect to radial through hole 150.

Figure 21:
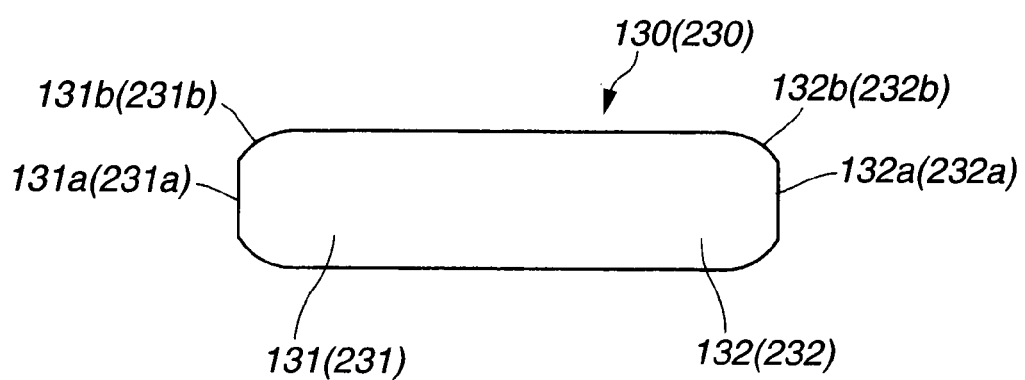
FIG. 21 is a plan view of a contact pin of the first input shaft actuator of FIG. 19.

FIG. 21 shows a plan view of contact pin 130, 230 as separated. Contact pin 130, 230 has the form of a cylindrical shape symmetrical with respect to its central lateral plane. Contact pin 130, 230 includes a flat longitudinal end surface 131a, 231a, and another flat longitudinal end surface 132a, 232a. The outer longitudinal end portion 131, 231 includes a chamfer 131b, 231b at the circumferential periphery, while the inner longitudinal end portion 132, 232 includes a chamfer 132b, 232b at the circumferential periphery.

Figure 22:
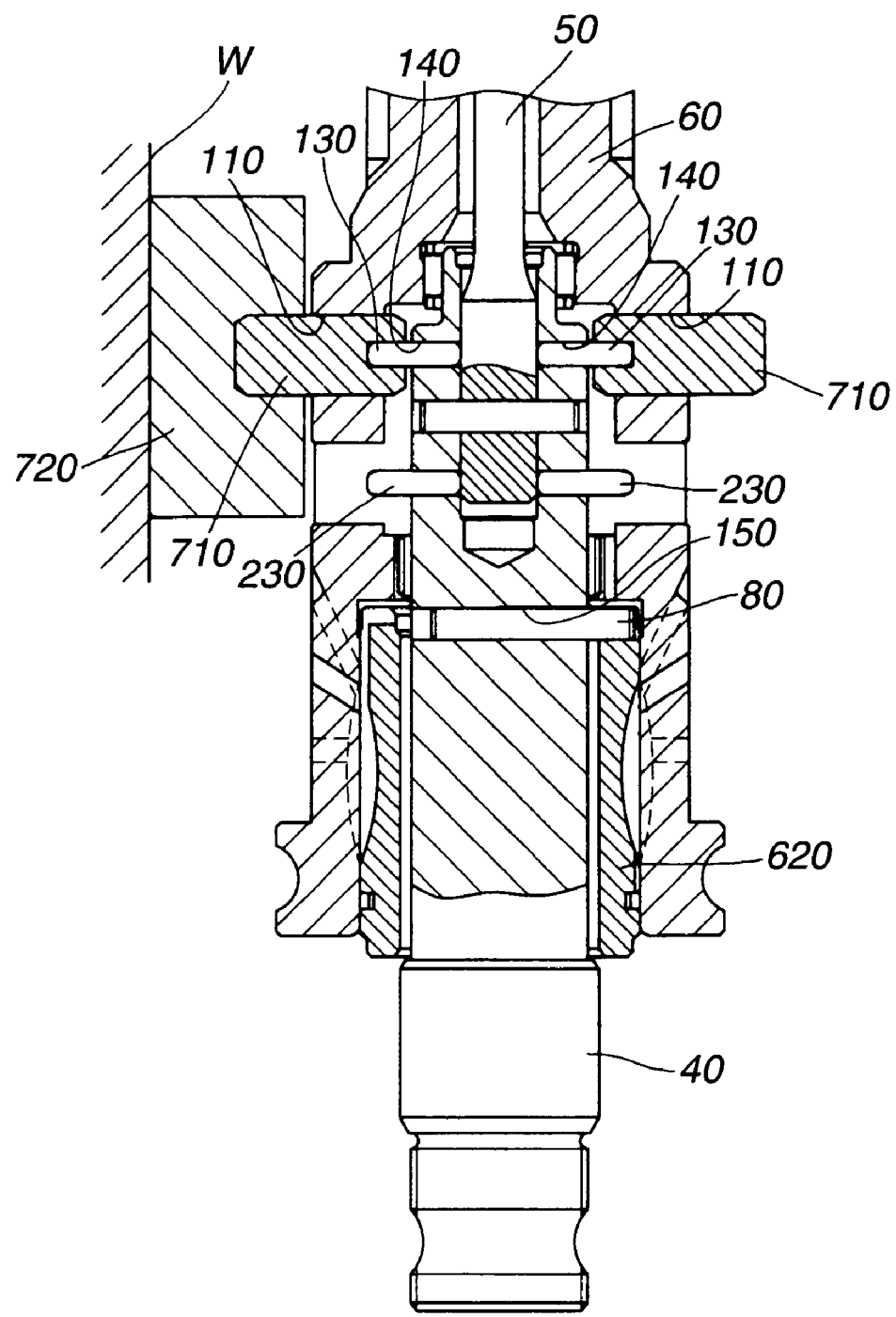
FIG. 22 is a partial side sectional view of the power steering apparatus of FIG. 18 in an assembling process.
Figure 23:
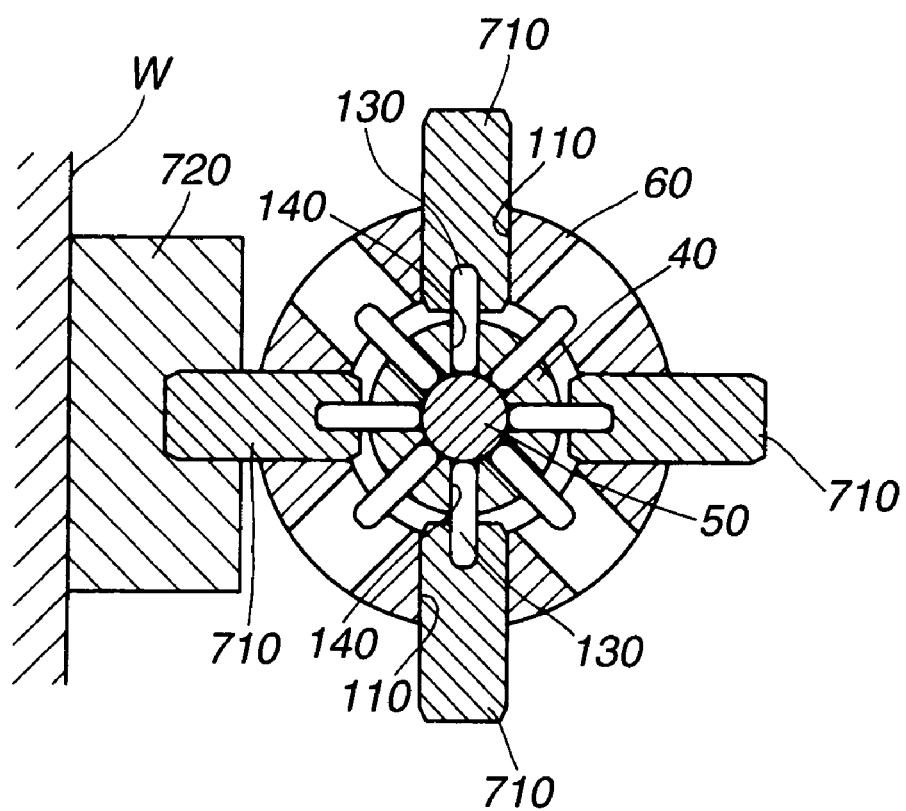
FIG. 23 is a cross sectional view of a first input shaft actuator of the power steering apparatus of FIG. 18 in the assembling process.

The following describes a method of assembling the power steering apparatus, specifically a method of mounting the contact pin 130, 230 into input shaft 40, with reference to FIGS. 22 and 23. Although the following description specifically refers to first input shaft actuator 100, second input shaft actuator 200 is constructed similarly.

The method generally includes: fitting and fixing, by engagement pin 80, the rotor 620 to the outer circumferential surface of input shaft 40; inserting one longitudinal end portion of torsion bar 50 into input shaft 40; inserting the other longitudinal end portion of torsion bar 50 into output shaft 60; before fixing the torsion bar 50 to output shaft 60, rotating the input shaft 40 with respect to output shaft 60 so that the center axis of each pin support hole 140 is identical to the center axis of the corresponding piston slide bore 110; and inserting and press-fitting two opposed contact pins 130, 130 into the corresponding two opposed pin support holes 140, 140 simultaneously.

The operation of inserting and press-fitting two opposed contact pins 130, 130 is implemented as follows. A guide 710 is adapted to retain contact pin 130, and to slide in piston slide bore 110. First, two guides 710 are used to retain the two opposed contact pins 130, 130, respectively. Guide 710 has the form of a cylindrical shape having the same diameter as or a little shorter diameter than the diameter of piston slide bore 210. Second, one guide 710 is retained in the horizontal position by a guide support 720 fixed to a vertical wall W. Third, the two guides 710, 710, which retain the two opposed contact pins 130, 130, are inserted into two opposed piston slide bores 110. Fourth, guides 710, 710 are further slid inwardly through piston slide bores 110, 110 so that contact pin 130 is located at the opening of pin support hole 140. Fifth, one guide 710 opposed to the vertical wall W is pushed toward the vertical wall W so that the two contact pins 130, 130 are inserted into the respective two pin support holes 140, 140 simultaneously. When the guide 710 opposed to vertical wall W is pushed toward the vertical wall W so that contact pin 130 retained by the opposed guide 710 is inserted into pin support hole 140, a reaction force is acted from vertical wall W to guide 710 closer to vertical wall W so that contact pin 130 retained by the closer guide 710 is simultaneously inserted into pin support hole 140. The foregoing process is repeated to mount all the contact pins 130 and all the contact pins 230 in input shaft 40. After that, torsion bar 50 is fixed to output shaft 60 by engagement pin 80.

The foregoing assembling method produces the following advantageous effects. The simultaneous insertion of two opposed contact pins 130 causes no unbalanced force applied to input shaft 40. This enables to mount the contact pin 130 to input shaft 40 under condition that input shaft 40 is retained in a desired position with respect to output shaft 60, and prevents the first bearing 91 for supporting the input shaft 40 from being damaged.

Each pair of two opposed pin support holes 140, 140 is formed in input shaft 40 by a single stroke of drilling, so as to ensure that the longitudinal direction of one pin support hole 140 is identical to that of the opposed pin support hole 140. Each pair of two opposed piston slide bores 110, 110 are formed similarly. The foregoing method of assembling causes no trouble that contact pin 130 is inclined by an unbalanced force.

The power steering apparatus according to the third embodiment provides at least the following advantageous effects. The construction that the contact between contact pin 130, 230 and piston 120, 220 is relatively remote from the center of input shaft 40, is effective for applying a larger torque to input shaft 40. The construction that the inner longitudinal end of contact pin 130 is in contact with the outer peripheral surface of torsion bar 50, is effective for minimizing variations in the position of the outer longitudinal end of contact pin 130 between the contact pins 130 under no influence of the accuracy of the shape of input shaft 40. The construction that the contact pin 130 is press-fitted into pin support hole 140, is effective for preventing the contact pin 130 from dropping from pin support hole 140. The construction that the contact pin 130, 230 is symmetrically formed, requires no operation of confirming that contact pin 130 is in position during the assembling process. The construction that the inner longitudinal end surface 132a of contact pin 130 is flat, is effective for suppressing a stress applied to the inner longitudinal end surface 132a because the inner longitudinal end surface 132a is in surface-to-surface contact with the outer peripheral surface of torsion bar 50. The operation of mounting the contact pin 130, 230 into input shaft 40 before fixing the input shaft 40 to output shaft 60, is effective for improving the easiness of mounting the contact pin 130, 230, because it is unnecessary to rotate the input shaft 40 with respect to output shaft 60 against the elastic force of torsion bar 50 during the operation.

Figure 24:
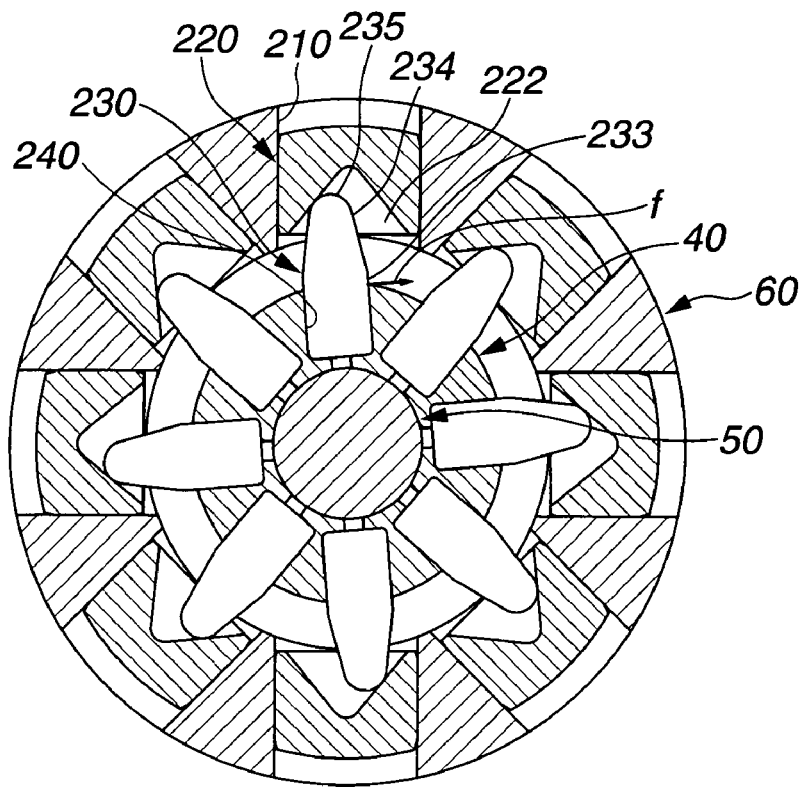
FIG. 24 is a cross sectional view of a second input shaft actuator of a power steering apparatus in accordance with a fourth embodiment of the present invention.
Figure 25:
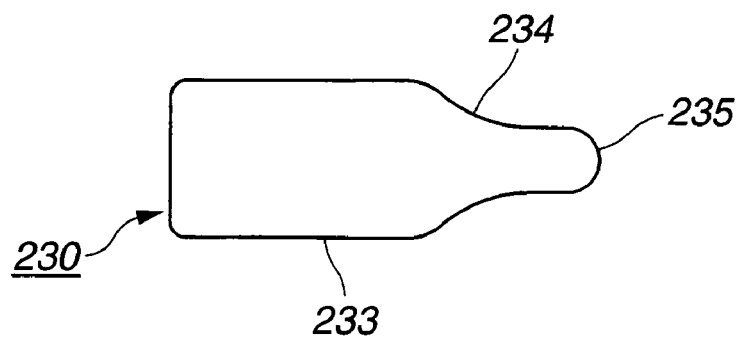
FIG. 25 is a plan view of a contact pin of the second input shaft actuator of FIG. 24.

The following describes a power steering apparatus in accordance with a fourth embodiment of the present invention with reference to FIGS. 24 and 25. The fourth embodiment differs from the second embodiment in the shape of contact pin 130, 230 of first and second input shaft actuators 100 and 200. The fourth embodiment is described with the same notations with regard to similar elements as in the second embodiment. Although the following description specifically refers to second input shaft actuator 200, first input shaft actuator 100 is constructed similarly.

As shown in FIG. 24, the portion of contact pin 230 which is inserted in input shaft 40 has a larger diameter than in the second embodiment, while the outer tip of contact pin 230 has the same diameter as in the second embodiment. That is, contact pin 230 includes a large-diameter portion 233 which is cylindrically formed and inserted in input shaft 40; a tapered portion 234 whose diameter decreases toward the tip; and a tip portion 235 which is in a curved surface and adapted to be in contact with recess 222 of piston 220.

The diameter of large-diameter portion 233 is maximized so as to be sufficiently resistant to the stress from piston 220 in the circumferential direction of input shaft 40, but limited so as to prevent interference between adjacent two contact pins 230, 230. The longitudinal length of large-diameter portion 233 is set longer than the depth of pin support hole 240 of input shaft 40 so that the boundary between large-diameter portion 233 and tapered portion 234 is located outside of the outer peripheral surface of input shaft 40.

The tapered portion 234 of contact pin 230 has the form of a circular conical surface so that tapered portion 234 has a higher rigidity against the stress of piston 220. Tapered portion 234 may be formed so that the longitudinal section is defined by a pair of concave slopes as shown in FIG. 25.

The tip portion 235 of contact pin 230 has the form of a semispherical shape so that tip portion 235 is in smooth sliding contact with recess 222 during the inward and outward motion of piston 220 in the radial direction of output shaft 60. Thus, the resistance in the slide between tip portion 235 and recess 222 is low.

When piston 220 pushes the contact pin 230, the pushing force causes a shear force f to contact pin 230 at the opening of pin support hole 240, as shown in FIG. 24. The large-diameter portion 233 of contact pin 230 sufficiently bears the shear force f. Although the diameter of the portion of contact pin 230 which is subject to a large shear force f is sufficiently large, the diameter of tip portion 235 is relatively small so as to provide a sufficient space for piston 220 to stroke, and thereby to ensure a sufficient feedback steering torque to input shaft 40.

Contact pin 230 according to the fourth embodiment may be applied to the third embodiment.

This application is based on a prior Japanese Patent Application No. 2006-211729 filed on Aug. 3, 2006, and a prior Japanese Patent Application No. 2007-001888 filed on Jan. 10, 2007. The entire contents of these Japanese Patent Application Nos. 2006-211729 and 2007-001888 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A power steering apparatus comprising:
a steering shaft adapted to be connected to a steering wheel, the steering shaft comprising a first shaft and a second shaft;
a hydraulic power cylinder mechanically linked to the steering shaft, the hydraulic power cylinder having first and second fluid pressure chambers for producing an assist steering effort;
a hydraulic pump for supplying a fluid pressure to the hydraulic power cylinder;

a steering shaft actuator for controlling the steering shaft, the steering shaft actuator comprising a first actuator and a second actuator;

a condition sensor for collecting information concerning at least one of an associated host vehicle, an associated driver and an associated road; and a fluid pressure controller for receiving the collected information from the condition sensor, and controlling the steering shaft actuator based on the collected information, wherein the first actuator comprises:
 a first contact surface formed in a radial outer periphery of the first shaft;
 a first piston provided in the second shaft, and adapted to be in contact with the first contact surface; and
 a first fluid chamber for receiving the fluid pressure from the hydraulic pump, and pushing the first piston toward the first contact surface so as to apply torque to the first shaft toward an increased relative rotation between the first shaft and the second shaft in a first direction; and the second actuator comprises:
 a second contact surface formed in a radial outer periphery of the first shaft;
 a second piston provided in the second shaft, and adapted to be in contact with the second contact surface; and
 a second fluid chamber for receiving the fluid pressure from the hydraulic pump, and pushing the second piston toward the second contact surface so as to apply torque to the first shaft toward an increased relative rotation between the first shaft and the second shaft in a second direction opposite to the first direction.

2. The power steering apparatus as claimed in claim 1, wherein the collected information includes information concerning at least one of a driver's level of consciousness and a driver's level of attention.

3. The power steering apparatus as claimed in claim 1, wherein:
 one of the first and second shafts of the steering shaft is an input shaft adapted to be connected to the steering wheel;
 another of the first and second shafts of the steering shaft is an output shaft mechanically linked to the hydraulic power cylinder; and
 the steering shaft further comprises a torsion bar coupling the input shaft to the output shaft.

4. The power steering apparatus as claimed in claim 3, further comprising a rotary valve for regulating and distributing the fluid pressure to the first and second fluid pressure chambers of the hydraulic power cylinder in accordance with an angular displacement of the input shaft with respect to the output shaft.

5. The power steering apparatus as claimed in claim 1, wherein the collected information includes information concerning a position of the host vehicle with respect to an associated driving lane of the road, and wherein the fluid pressure controller is configured to control the steering shaft actuator so as to prevent the host vehicle from deviating from the driving lane based on the collected information.

6. The power steering apparatus as claimed in claim 1, wherein
 each of the first and second contact surfaces of the steering shaft actuator is an angled contact surface;
 each of the first and second pistons of the steering shaft actuator is a piston mounted for motion in a radial direction of the steering shaft.

7. The power steering apparatus as claimed in claim 6, wherein each of the first and second pistons has a curved surface adapted to be in contact with a corresponding one of the first and second contact surfaces.

8. The power steering apparatus as claimed in claim 6, wherein each of the first and second contact surfaces defines a crest arranged to move within a restricted range so as for the first shaft to move within a desired range of angle with respect to the second shaft.

9. The power steering apparatus as claimed in claim 6, wherein each of the first and second pistons has a longitudinal end having a chamfer at a radial outer periphery.

10. The power steering apparatus as claimed in claim 1, wherein the collected information includes information concerning at least one of a driver's level of consciousness and a driver's level of attention, and wherein the fluid pressure controller is configured to:
 determine whether or not the at least one of the driver's level of consciousness and the driver's level of attention is below a threshold; and
 when determining that the at least one of the driver's level of consciousness and the driver's level of attention is below the threshold, supply the fluid pressure alternately to the first fluid chamber of the steering shaft actuator and to the second fluid chamber of the steering shaft actuator.

11. The power steering apparatus as claimed in claim 1, wherein the collected information includes information concerning a position of the host vehicle with respect to an associated driving lane of the road, and wherein the fluid pressure controller is configured to:
 select one from the first and second fluid chambers of the steering shaft actuator based on the position of the host vehicle with respect to the driving lane; and
 supply the fluid pressure to the selected one of the first and second fluid chambers of the steering shaft actuator.

12. The power steering apparatus as claimed in claim 1, wherein the fluid pressure controller comprises:
 a control valve for regulating the fluid pressure;
 a solenoid for actuating the control valve; and
 a control unit for controlling the solenoid based on the collected information.

13. The power steering apparatus as claimed in claim 12, wherein the control valve has a longitudinal axis extending along a longitudinal axis of the solenoid and along a longitudinal axis of the steering shaft.

14. A power steering apparatus comprising:
 a housing;
 a steering shaft adapted to be connected to a steering wheel, the steering shaft comprising a first shaft and a second shaft, wherein one of the first and second shafts of the steering shaft is an input shaft adapted to be connected to a steering wheel;
 a main piston mounted within the housing, the main piston defining first and second fluid pressure chambers on respective sides thereof;
 a motion conversion mechanism for converting a rotary motion of the input shaft into a longitudinal motion of the main piston;
 a hydraulic pump for supplying a fluid pressure to the first and second fluid pressure chambers;
 a rotary valve for directing the fluid pressure selectively to one of the first and second fluid pressure chambers;

a mechanism for outputting a steering effort in accordance with the longitudinal motion of the main piston;

a steering shaft actuator for controlling the steering shaft, the steering shaft actuator comprising a first actuator and a second actuator;

a condition sensor for collecting information concerning at least one of an associated host vehicle, an associated driver and an associated road; and a fluid pressure controller for receiving the collected information from the condition sensor, and controlling the steering shaft actuator based on the collected information, wherein the first actuator comprises:

a first contact surface formed in a radial outer periphery of the first shaft;

a first piston provided in the second shaft, and adapted to be in contact with the first contact surface; and a first fluid chamber for receiving the fluid pressure from the hydraulic pump, and pushing the first piston toward the first contact surface so as to apply torque to the first shaft toward an increased relative rotation between the first shaft and the second shaft in a first direction; and the second actuator comprises:

a second contact surface formed in a radial outer periphery of the first shaft;

a second piston provided in the second shaft, and adapted to be in contact with the second contact surface; and a second fluid chamber for receiving the fluid pressure from the hydraulic pump, and pushing the second piston toward the second contact surface so as to apply torque to the first shaft toward an increased relative rotation between the first shaft and the second shaft in a second direction opposite to the first direction.

15. The power steering apparatus as claimed in claim 14, wherein:

another of the first and second shafts of the steering shaft is an output shaft mounted within the housing; and the steering shaft further comprises a torsion bar coupling the input shaft to the output shaft, wherein the rotary valve is configured to regulate and distribute the fluid pressure to the first and second fluid pressure chambers of the hydraulic power cylinder in accordance with an angular displacement of the input shaft with respect to the output shaft, the power steering apparatus further comprising:

a first fluid passage defined in the output shaft, and connected to the rotary valve, the first fluid passage being located in a position distant in a longitudinal direction of the output shaft from the steering shaft actuator;

a second fluid passage defined in the housing, the second fluid passage connecting the first fluid passage to the first fluid pressure chamber;

a third fluid passage defined in the output shaft, and connected to the rotary valve, the third fluid passage being located in a position distant in the longitudinal direction of the output shaft from the steering shaft actuator; and a fourth fluid passage defined in the housing, the fourth fluid passage connecting the third fluid passage to the second fluid pressure chamber.

16. The power steering apparatus as claimed in claim 14, wherein the first actuator and the second actuator are arranged in a longitudinal direction of the input shaft.

17. The power steering apparatus as claimed in claim 14, wherein:

another of the first and second shafts of the steering shaft is an output shaft mounted within the housing; and the steering shaft further comprises a torsion bar coupling the input shaft to the output shaft, wherein:

each of the first and second contact surfaces of the steering shaft actuator is formed in a contact pin extending outwardly from a radial outer periphery of the input shaft;

each of the first and second pistons of the steering shaft actuator is a piston mounted in the output shaft for motion in a radial direction of the output shaft, the piston having a recess at an inner longitudinal end, the recess being adapted to be in contact with a corresponding one of the contact pins; and each of the first and second fluid chambers of the steering shaft actuator is a fluid chamber for receiving the fluid pressure, and pushing a corresponding one of the first and second pistons toward a corresponding one of the contact pins so as to apply the torque to the input shaft.

18. The power steering apparatus as claimed in claim 17, wherein the recess of each of the first and second pistons includes a contact surface angled with respect to the direction of motion of the piston.

19. The power steering apparatus as claimed in claim 17, wherein each contact pin includes an outer longitudinal end including a curved contact surface adapted to be in contact with a corresponding one of the first and second pistons.

20. The power steering apparatus as claimed in claim 17, wherein the input shaft is disposed radially outside of the torsion bar, wherein the output shaft is disposed radially outside of the input shaft, wherein the input shaft includes a pin support hole extending in a radial direction of the input shaft for each contact pin, wherein the output shaft includes a piston slide bore extending in a radial direction of the output shaft for each contact pin, wherein each contact pin is mounted in the pin support hole, and wherein each contact pin has one longitudinal end outside of the radial outer periphery of the input shaft, and another longitudinal end in contact with a radial outer periphery of the torsion bar.

21. The power steering apparatus as claimed in claim 20, wherein each contact pin is press-fitted in the pin support hole.

22. The power steering apparatus as claimed in claim 20, wherein each contact pin is in a symmetrical shape with respect to a central lateral plane.

23. The power steering apparatus as claimed in claim 20, wherein the other longitudinal end of each contact pin includes a chamfer at a periphery.

24. The power steering apparatus as claimed in claim 20, wherein the other longitudinal end of each contact pin includes a flat end surface adapted to be in contact with the torsion bar.

25. The power steering apparatus as claimed in claim 20, wherein the recess of each of the first and second pistons includes a contact surface angled with respect to the direction of motion of the piston, and wherein the one longitudinal end of each contact pin has an angled surface adapted to be in surface-to-surface contact with the angled contact surface of the recess.

26. The power steering apparatus as claimed in claim 20, comprising a plurality of the contact pins for each of the first and second actuators, wherein in each of the first and second actuators, each of the contact pins is disposed in an opposite position to another one of the contact pins with respect to a radial center of the input shaft.

27. The power steering apparatus as claimed in claim 20, wherein the rotary valve comprises:

a rotor fixed to the input shaft through an engagement pin; and a valve body fixed to the output shaft, and disposed radially outside of the rotor, and wherein the input shaft includes a radial through hole for the engagement pin, and wherein the pin support hole extends in the same radial direction of the input shaft as the through hole.

28. The power steering apparatus as claimed in claim 20, wherein each contact pin includes a portion tapered toward the one longitudinal end, the tapered portion being located radially outside of the input shaft.

* * * * *